United States Patent
Hong et al.

(10) Patent No.: US 11,946,452 B2
(45) Date of Patent: Apr. 2, 2024

(54) CONTROL SYSTEM FOR WIND TURBINES IN COLD CLIMATES

(71) Applicant: Regents of the University of Minnesota, Minneapolis, MN (US)

(72) Inventors: Jiarong Hong, New Brighton, MN (US); Linyue Gao, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 18/005,549

(22) PCT Filed: Jul. 13, 2021

(86) PCT No.: PCT/US2021/041427
§ 371 (c)(1),
(2) Date: Jan. 13, 2023

(87) PCT Pub. No.: WO2022/015729
PCT Pub. Date: Jan. 20, 2022

(65) Prior Publication Data
US 2023/0258154 A1   Aug. 17, 2023

Related U.S. Application Data

(60) Provisional application No. 63/052,212, filed on Jul. 15, 2020.

(51) Int. Cl.
*F03D 7/02* (2006.01)
*F03D 80/40* (2016.01)

(52) U.S. Cl.
CPC .......... *F03D 7/0224* (2013.01); *F03D 80/40* (2016.05); *F05B 2270/328* (2013.01); *F05B 2270/335* (2013.01)

(58) Field of Classification Search
CPC .. F03D 80/40; F03D 7/0223; F05B 2270/328; F05B 2270/335; Y02E 10/72
See application file for complete search history.

(56) References Cited

U.S. PATENT DOCUMENTS

| | | | |
|---|---|---|---|
| 7,922,449 B2 * | 4/2011 | Scholte-Wassink | F03D 7/0224 416/37 |
| 8,434,360 B2 | 5/2013 | Cheng | |
| 9,458,834 B2 | 10/2016 | Miranda et al. | |
| 2010/0135787 A1 * | 6/2010 | Scholte-Wassink | F03D 7/0224 416/1 |
| 2017/0058871 A1 * | 3/2017 | Movsichoff | F03D 7/0224 |

FOREIGN PATENT DOCUMENTS

| | | |
|---|---|---|
| CA | 3009204 A1 | 12/2018 |
| CN | 102410140 A | 4/2012 |
| CN | 102410140 B | 12/2013 |
| CN | 104454386 A | 3/2015 |
| EP | 2287464 A2 | 2/2011 |
| EP | 2550452 B1 | 6/2014 |
| JP | 2004084527 A | 3/2004 |
| WO | 2011117246 A2 | 9/2011 |

OTHER PUBLICATIONS

"Winterwind 2019: Technology Retrofit and Service Approach for Performance Optimization in Cold Climates," Siemens Gamesa, 2019 (Applicant points out, in accordance with MPEP 609.04(a), that the year of publication, 2019, is sufficiently earlier than the effective U.S. filing date, so that the particular month of publication is not in issue.), 17 pp.

Alsabagh et al., "A Review of the Effects of Ice Accretion on the Structural Behavior of Wind Turbines," Wind Engineering, vol. 37, No. 1, Feb. 1, 2013, pp. 59-70.

Anonymous, "Wind Energy Projects in Cold Climates", Internet Citation, Jan. 2005, pp. 1-36, Retrieved from the Internet: URL: http://virtual.vtt.fi/virtual/arcticwind/reports/recommnedations.pdf.

Barker et al., "Ice Loading on Danish Wind Turbines Part 1: Dynamic Model Tests," Cold Regions Science and Technology, vol. 41, Jan. 2005, pp. 1-23.

Battisti, Wind Turbines in Cold Climates: Icing Impacts and Mitigation Systems, 2015 (Applicant points out, in accordance with MPEP 609.04(a), that the year of publication, 2015, is sufficiently earlier than the effective U.S. filing date, so that the particular month of publication is not in issue.), pp. 257-259.

Beaugendre et al., "FENSAP-ICE's Three-Dimensional in-Flight Ice Accretion Module: ICE3D," Journal of Aircraft, vol. 40, No. 2, Mar.-Apr. 2003, pp. 239-247.

Blasco et al., "Effect of Icing Roughness on Wind Turbine Power Production," Wind Energy, vol. 20, Jan. 2016, pp. 601-617.

Bragg et al., "Iced-Airfoil Aerodynamics," Progress in Aerospace Sciences, vol. 41, No. 5, Jul. 2005, 48 pp.

Cattin et al., "Evaluation of Ice Detection Systems for Wind Turbines," Meteotest VGB Research Project No. 392, Feb. 2016, 111 pp.

(Continued)

*Primary Examiner* — Igor Kershteyn
(74) *Attorney, Agent, or Firm* — Shumaker & Sieffert, P.A.

(57) ABSTRACT

Control systems are described that mitigate the effects of icing events on wind turbines. Example methods include determining, with a control system, that an icing event has begun to affect the wind turbine; based on a determination that the icing event has begun to affect the wind turbine, changing a phase of the wind turbine with the control system to an operational-icing phase by modifying angles of attack of blades of the wind turbine via changing blade pitch angles, wherein the wind turbine continues to generate electrical power when the wind turbine is in the operational-icing phase; and based on a determination that electrical power generation of the wind turbine is below a threshold, changing the phase of the wind turbine with the control system to a stopped-icing phase, wherein rotation of the blades of the wind turbine is halted when the wind turbine is in the stopped-icing phase.

20 Claims, 21 Drawing Sheets

(56) References Cited

OTHER PUBLICATIONS

Chamorro et al., "On the Scale-to-Scale Coupling Between a Full-Scale Wind Turbine and Turbulence." Journal of Turbulence, vol. 16, No. 7, Jan. 2015, pp. 617-632.
Chamorro et al., "Turbulence Effects on a Full-Scale 2.5 MW Horizontal-Axis Wind Turbine Under Neutrally Stratified Conditions," Wind Energy, vol. 17, No. 8, Feb. 2015, pp. 339-349.
Dao et al., "Condition Monitoring and Fault Detection in Wind Turbines Based on Cointegration Analysis of SCADA Data," Renewable Energy, vol. 116, Feb. 2018, pp. 107-122.
Davis et al., "Ice Detection on Wind Turbines Using the Observed Power Curve," Wind Energy, vol. 19, No. 6, Jul. 2015, pp. 999-1010.
Davis et al., "Identifying and Characterizing the Impact of Turbine Icing on Wind Farm Power Generation," Wind Energy, vol. 19, Sep. 2015, pp. 1503-1518.
Davis, "Icing Impacts on Wind Energy Production," DTU Wind Energy, Oct. 2014, 157 pp.
Etemaddar et al., "Wind Turbine Acrodynamic Response Under Atmospheric Icing Conditions," Wind Energy, vol. 17, No. 2, Feb. 2014, pp. 241-265.
Fakorede et al., "Ice Protection Systems for Wind Turbines in Cold Climate: Characteristics, Comparisons and Analysis," Renewable and Sustainable Energy Reviews, vol. 65, Nov. 2016, pp. 662-675.
Gantasala et al., "Identification of Ice Mass Accumulated on Wind Turbine Blades Using its Natural Frequencies," Wind Engineering, vol. 42, No. 1, Aug. 21, 2017, pp. 66-84.
Gantasala et al., "Numerical Investigation of the Aeroelastic Behavior of a Wind Turbine with Iced Blades," Energies, vol. 12, Jun. 2019, 24 pp.
Gao et al., "A Hybrid Strategy Combining Minimized Leading-Edge Electric-Heating and Superhydro-/Ice-Phobic Surface Coating for Wind Turbine Icing Mitigation," Renewable Energy, vol. 140, Sep. 2019, pp. 943-956.
Gao et al., "An Experimental Investigation of Dynamic Ice Accretion Process on a Wind Turbine Airfoil Model Considering Various Icing Conditions," International Journal of Heat and Mass Transfer, vol. 133, pp. 930-939.
Gao et al., "An Experimental Investigation on the Dynamic Glaze Ice Accretion Process Over a Wind Turbine Airfoil Surface," International Journal of Heat and Mass Transfer, vol. 149, Mar. 2020, 12 pp.
Gao et al., "An Experimental Study on the Aerodynamic Performance Degradation of a Wind Turbine Blade Model Induced by Ice Accretion Process," Renewable Energy, vol. 133, Oct. 2018, pp. 663-675.
Gao et al., "Effects of Inflow Turbulence on Structural Deformation of Wind Turbine Blades," J. Wind Eng. Ind. Aerodyn, vol. 199, Jan. 2020, 16 pp.
Gao et al., "Effects of Inflow Turbulence on Structural Response of Wind Turbine Blades," Journal of Wind Engineering & Industrial Aerodynamics, vol. 199, Apr. 2020, 12 pp.
Gao et al., "Experimental Investigations on Wind Turbine Icing Physics and Anti-/De-Icing Technology," Dissertation Iowa State University, 2019 (Applicant points out, in accordance with MPEP 609.04(a), that the year of publication, 2019, is sufficiently earlier than the effective U.S. filing date, so that the particular month of publication is not in issue.), 258 pp.
Gao et al., "Quantification of the 3D Shapes of the Ice Structures Accreted on a Wind Turbine Airfoil Model," Journal of Visualization, May 2019, 7 pp.
Gao et al., "Wind Turbine Performance in Natural Icing Environments: A Field Characterization," Cold Regions Science and Technology, Jan. 2021, 34 pp.
Gravesen et al., "Ice Loading on Danish Wind Turbines: Part 2. Analyses of Dynamic Model Test Results," Cold Regions Science and Technology, vol. 41, Jan. 2005, pp. 25-47.
Gravesen, "Ice Loads for Offshore Wind Turbines in Southern Baltic Sea," Proceedings of the 20th International Conference on Port and Ocean Engineering under Arctic Conditions, Jun. 9-12, 2009, 13 pp.
Hansson et al., "Quantification of Icing Losses in Wind Farms," Vindforsk, Report 2016:299, 2016 (Applicant points out, in accordance with MPEP 609.04(a), that the year of publication, 2016, is sufficiently earlier than the effective U.S. filing date, so that the particular month of publication is not in issue.), 70 pp.
Hendrikse et al., "Experimental Validation of a Model for Prediction of Dynamic Ice-Structure Interaction," Cold Regions Science and Technology, vol. 151, Jul. 2018, pp. 345-358.
Homola et al., "Performance Losses Due to Ice Accretion for a 5 MW Wind Turbine," Wind Energy, No. 15, No. 3, Apr. 2012, pp. 379-389.
Homola et al., "The Relationship Between Chord Length and Rime Icing on Wind Turbines," Wind Energy, vol. 13, Oct. 2010, pp. 627-632.
Hu et al., "Wind Turbines Ice Distribution and Load Response Under Icing Conditions," Renewable Energy, vol. 113, Dec. 2017, pp. 608-619.
Hudecz et al., "Ice Accretion on Wind Turbine Blades," Proceedings of the 15th International Workshop on Atmospheric Icing of Structures (IWAIS XV), Sep. 8-11, 2013, 9 pp.
Ihlis et al., "Implementation of Machine Learning to Model Losses from Icing of Wind Turbines," Master of Science Thesis KTH School of Industrial Engineering and Management, Jan. 13, 2015, 38 pp.
International Preliminary Report on Patentability from International Application No. PCT/US2021/041427 dated Jan. 26, 2023, 7 pp.
International Search Report and Written Opinion of International Application No. PCT/US2021/041427, dated Dec. 13, 2021, 11 pp.
Jasinski et al., "Wind Turbine Performance Under Icing Conditions," Journal of Solar Energy Engineering, vol. 120, No. 1, Feb. 1998, pp. 60-65.
Kraj et al., "Phases of Icing on Wind Turbine Blades Characterized by Ice Accumulation," Renewable Energy, vol. 35, May 2010, pp. 966-972.
Laakso et al., "State-of-the-Art of Wind Energy in Cold Climates," English, vol. 152, Sep. 2010, 50 pp.
Lamraoui et al., "Atmospheric Icing Impact on Wind Turbine Production," Cold Regions Science and Technology, vol. 100, Jan. 2014, pp. 36-49.
Lehtomaki, "Wind Energy in Cold Climates Available Technologies—report 2016," IEA Wind Task 19, May 2016, 120 pp.
Makkonen et al., "Modelling and Prevention of Ice Accretion on Wind Turbines," Wind Engineering, vol. 25, No. 1, Jan. 2001, pp. 3-21.
Molina et al., "Application of DDES to Iced Airfoil in SU2," Seventh HRLM Symposium, Sep. 19-21, 2018, 2 pp.
Morgan et al., "Assessment of Safety Risks Arising from Wind Turbine Icing," Boreas VI—Wind Energy Prod. Cold Clim, Mar. 31-Apr. 2, 1998, pp. 113-121.
Pedersen et al., "Towards a CFD Model for Prediction of Wind Turbine Power Losses due to Icing in Cold Climate," International Symposium on Transport Phenomena and Dynamics of Rotating Machinery, Apr. 2016, 6 pp.
Reid et al., "FENSAP-ICE Simulation of Icing on Wind Turbine Blades, Part 1: Performance Degradation," 51st AIAA Aerospace Sciences Meeting, Jan. 7-10, 2013, 18 pp.
Rene et al., "Four Years of Monitoring a Wind Turbine Under Icing Conditions," IWAIS XIII, Andermatt, Sep. 8-11, 2009, 5 pp.
Ribeiro et al., "Icing Losses—What Can We Learn From Production and Meteorological Data?," WindEurope, Sep. 2016, 10 pp.
Roberge et al., "Field Analysis, Modeling and Characterization of Wind Turbine Hot Air Ice Protection Systems," Cold Regions Science and Technology, Apr. 2019, 24 pp.
Shi et al., "Investigation on Ice Loads for Offshore Wind Turbine in Varying Ice Conditions," Proceedings of the 28th (2018) International Ocean and Polar Engineering Conference, Jun. 10-15, 2018, pp. 483-488.
Shi et al., "Numerical Study of Ice-Induced Loads and Responses of a Monopile-Type Offshore Wind Turbine in Parked and Operating Conditions," Cold Regions Science and Technology, vol. 123, Mar. 2016, pp. 121-139.

(56) References Cited

OTHER PUBLICATIONS

Shu et al., "Study of Ice Accretion Feature and Power Characteristics of Wind Turbines at Natural Icing Environment," Cold Regions Science and Technology, vol. 147, Mar. 2018, pp. 45-54.
Shu et al., "Study on Small Wind Turbine Icing and its Performance," Cold Regions Science and Technology, vol. 134, Feb. 2017, pp. 11-19.
Siemens Gamesa Renewable Energy Annual Report, 2019 (Applicant points out, in accordance with MPEP 609.04(a), that the year of publication, 2019, is sufficiently earlier than the effective U.S. filing date, so that the particular month of publication is not in issue.), 74 pp.
Son et al., "Development of Three-Dimensional Icing Simulation Code for Wind Turbines," Proceedings—Int. Workshop on Atmospheric Icing of Structures, Jun. 23-28, 2019, 8 pp.
Tagawa et al., "CFD Study of Airfoil Lift Reduction Caused by Ice Roughness," AIAA Aviation Forum, Jun. 25-29, 2018, 19 pp.
Yirtici et al., "Ice Accretion Prediction on Wind Turbines and Consequent Power Losses," Journal of Physics: Conference Series 753, Apr. 10, 2016, 9 pp.
Zanon et al., "Wind Energy Harnessing of the NREL 5 MW Reference Wind Turbine in Icing Conditions Under Different Operational Strategies," Renewable Energy, vol. 115, Aug. 2017, pp. 760-772.
Zhang et al., "Ice Detection Model of Wind Turbine Blades Based on Random Forest Classifier," Energies, vol. 11, No. 10, Sep. 2018, 15 pp.

\* cited by examiner

| Icing event | Pre-icing | Operational-icing | Stopped-icing | Post-icing |
|---|---|---|---|---|
| Ice accretion | | Meteorological icing | | |
| | | | Turbine ice accretion | |
| Wind turbine status | | Operational | Stopped/ idling | Operational |
| Power ($P$) | Regular | Reduction | None | Reduction |
| Pitch angle ($\beta$) | Regular | | Feathering | |
| Rotor speed ($\omega$) | Regular | Reduction | $\omega = 0$ or small | Reduction |

FIG. 8

CONTROL SYSTEM FOR WIND TURBINES IN COLD CLIMATES

This application is a national stage application under 35 U.S.C. § 371 of PCT Application No. PCT/US2021/041427, filed Jul. 13, 2021, which claims the benefit of U.S. Provisional Patent Application No. 63/052,212, filed Jul. 15 2020.

GOVERNMENT RIGHTS

This invention was made with government support under CBET-1454259 awarded by National Science Foundation. The government has certain rights in the invention.

BACKGROUND

Wind turbines are a growing part of the world's system for generating electricity. Generation of electricity from wind turbines is one of the leading ways of reducing the emission of greenhouse gases. However, there are challenges associated with deployment of wind turbines. For example, icing events affect wind turbines in cold climates. Ice structures may accrete over the wind turbine blade surface during a meteorological icing event due to in-cloud icing or precipitation, e.g., freezing drizzle, freezing rain or wet snow.

The accumulation of ice on the blades of a wind turbine may alter the geometry of the turbine blades, cause aerodynamic property degradation, and thus lead to severe power losses. Additionally, the ice accretion over the turbine blade surfaces may add additional loads on the turbine rotor. Moreover, ice may accumulate unevenly on the turbine blades, which may cause the blades to be unbalanced and intensely vibrated. In a long term, such structural effects may reduce the lifespan of a wind turbine.

SUMMARY

This disclosure describes techniques that may mitigate the effects of icing events on wind turbines. For example, this disclosure describes a wind turbine that may operate according to four or more phases: a pre-icing phase, an operational-icing phase, a stopped-icing phase, and a post-icing phase. A control system may cause the wind turbine to transition between the phases. As described herein, according to the control techniques applied by the control system, a wind turbine enters the pre-icing phase when meteorological icing occurs but no detectable effects the wind turbine operation. The wind turbine enters an operational-icing phase after the icing event begins to affect the wind turbine normal operation. The wind turbine may enter the stopped-icing phase from the operational-icing phase during the icing event. The wind turbine stops during the stopped-icing phase. This disclosure may also refer to the stopped-icing phase as the static-icing phase. The wind turbine may enter the post-icing phase after ice has stopped accumulating on blades of the wind turbine due to the icing event. For instance, the wind turbine may enter the post-icing phase from the stopped-icing phase. In some examples with light ice accretion, the wind turbine may enter the post-icing phase from the operational icing phase. This disclosure may also refer to the "phases" as "states." The techniques of this disclosure may be used in combination with other ice mitigation techniques.

In one example, this disclosure describes a method comprising: determining, with a control system, that an icing event has begun to affect a wind turbine; based on a determination that the icing event has begun to affect the wind turbine, changing a phase of the wind turbine with the control system to an operational-icing phase, wherein changing a phase of the wind turbine to the operational-icing phase comprises modifying an angle of attack of blades of the wind turbine via changing the blade pitch angle, wherein the wind turbine continues to generate electrical power when the wind turbine is in the operational-icing phase; and based on a determination that electrical power generation of the wind turbine is below a threshold, changing the phase of the wind turbine with the control system to a stopped-icing phase, wherein rotation of the blades of the wind turbine is halted when the wind turbine is in the stopped-icing phase.

In another example, this disclosure describes a wind turbine control system configured to determine that an icing event has begun to affect a wind turbine; based on a determination that the icing event has begun to affect the wind turbine, change a phase of the wind turbine with the control system to an operational-icing phase, wherein changing a phase of the wind turbine to the operational-icing phase comprises modifying an angle of attack of blades of the wind turbine via changing the blade pitch angle, wherein the wind turbine continues to generate electrical power when the wind turbine is in the operational-icing phase; and based on a determination that electrical power generation of the wind turbine is below a threshold, change the phase of the wind turbine with the control system to a stopped-icing phase, wherein rotation of the blades of the wind turbine is halted when the wind turbine is in the stopped-icing phase.

In another example, this disclosure describes a computer-readable storage medium comprising instructions that, when executed, one or more processing circuits to determine that an icing event has begun to affect a wind turbine; based on a determination that the icing event has begun to affect the wind turbine, change a phase of the wind turbine with the control system to an operational-icing phase, wherein changing a phase of the wind turbine to the operational-icing phase comprises modifying an angle of attack of blades of the wind turbine via changing the blade pitch angle, wherein the wind turbine continues to generate electrical power when the wind turbine is in the operational-icing phase; and based on a determination that electrical power generation of the wind turbine is below a threshold, change the phase of the wind turbine with the control system to a stopped-icing phase, wherein rotation of the blades of the wind turbine is halted when the wind turbine is in the stopped-icing phase.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF THE DRAWINGS

FIG. 8 is a schematic illustrating a variation of icing and turbine operational conditions during different phases of an icing event, i.e., pre-icing, operational-icing, stopped-icing, and post-icing.

DETAILED DESCRIPTION

Figure 1:
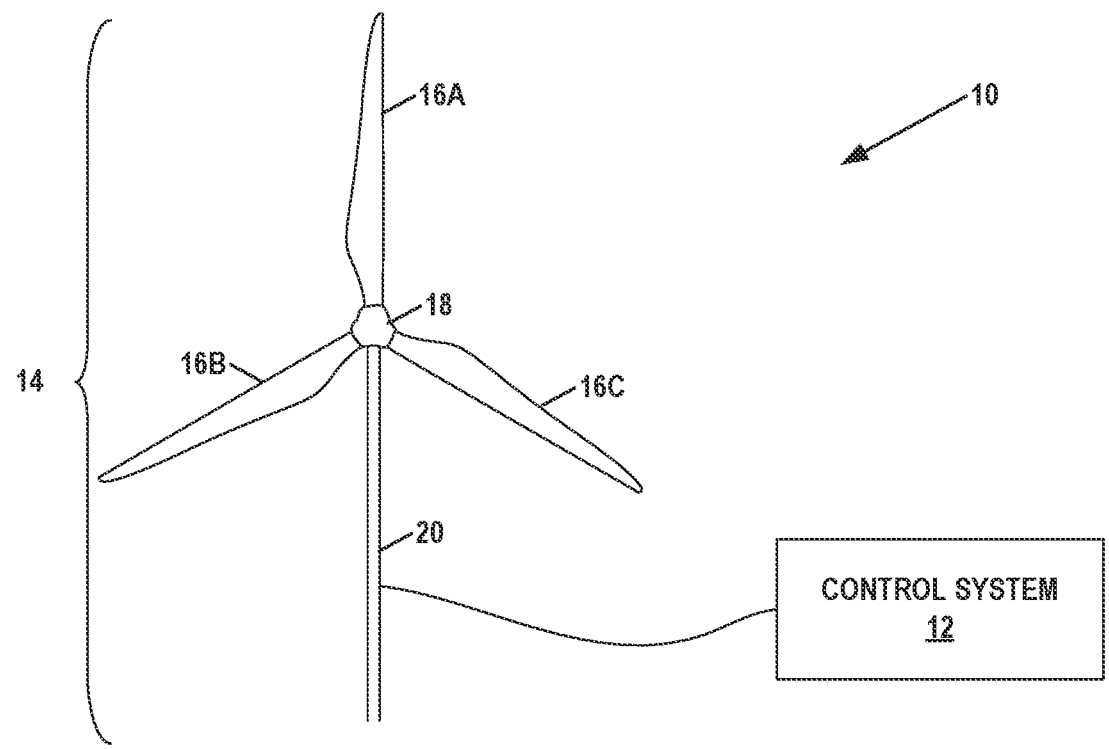
FIG. 1 is a conceptual diagram illustrating an example system that includes a control system and a wind turbine, in accordance with one or more techniques of this disclosure.

Wind energy is one of the most promising renewable energy sources for the massive production of electricity. Over 30% worldwide wind turbines in cold climate regions have icing issues, particularly for the northern states like Minnesota, Iowa, North Dakota, etc. However, icing can occur even in locations not typically associated with cold climates.

Ice accretion on turbine blades and irregular shedding during wind turbine operation may lead to load imbalance and excessive turbine vibration, often causing wind turbines to shut off for days or even months, resulting in a severe power loss up to 20% annual value. In addition, shedding of the large chunks of ice can be dangerous to public safety, which also adds constraints to wind farm siting, potentially limiting the growth of wind farm installations. The current and only commercial method that utilizes active heating of large areas of blades to reduce ice buildup is highly inefficient and energy consuming. Passive approaches via hydro-/ice-phobic coatings, being explored as viable strategies, are challenged by low durability of the coatings and their unaffordable expense for large-scale implementation and maintenance.

Ice accretion can lead to appreciable reductions in the rotor speed and pitch angle before the turbine reaches its operational limits. Such reductions increase correspondingly as the inflow wind speed increases, which may accelerate the airfoil stall process and result in more severe power loss. The 51-hour icing event yields a total power loss of ~50 kW, and the post-icing phase contributes a second-largest share of 17%, on the heel of the stopped-icing phase of 71%, associated with the long duration of natural ice melting process. Besides, blade structural response is highly sensitive to the ice accretion due to its fast reaction to the ice-induced lift penalties. The tower response also provides concrete evidence for the increase of the structural imbalance with ice accretion. Ice accretion can drastically alter the turbine blade profile, and induce severe aerodynamic penalties, i.e., lift decrease and drag increase, leading to up to 50% annual production losses. The unevenly distributed ice structures can add additional loads and edgewise vibration to the turbine and cause imbalance to the rotating system, which in the long term may shorten the lifespan of wind turbines.

Therefore, wind turbine icing represents a significant threat to the integrity of wind turbines in cold climate regions. A systematic evaluation of ice-induced effects on the performance degradations with respect to power output and structural response of a utility-scale wind turbine provides insights into the development of advanced control strategy for wind turbine icing mitigation. This disclosure describes a control strategy that takes advantage of both active pitch control (APC) and operational stop (OS) to alleviate icing risks. Compared to conventional thermal-based methods and hydrophobic or ice-phobic coatings, the control strategy described in this disclosure may have little or no extra energy consumption, may have highly competitive installation and maintenance costs, may have no concerns of durability, and may not require extra lightning protection.

The control strategies described in this disclosure can mitigate the blade icing and thereby compensate power reduction/reduce structural loading impact during the operation under icing conditions. As described herein, active pitch control (APC), which involves increasing the angle of attack (AoA) by modulating the pitch angle (β) of a blade, may reduce the ice accretion over the suction-side surface of the blade and may alleviate the aerodynamic penalties and thereby power loss. In addition, lab work suggests operational stops (OP) that proactively reduce the rotation speed of the turbine rotor (ω, even down to 0 rpm) at the beginning of a severe icing event can also potentially reduce the amount of ice accumulation on the blade and shorten the natural melting process. Fieldwork investigating the operational of turbine operation under icing conditions reveals that utility-scale wind turbines yield distinct power and structural behaviors in different phases of icing (pre-icing, operational-icing, stopped-icing and post-icing), suggesting a phase-dependent control strategy to alleviate the ice-induced negative effects. A control strategy for wind turbines operating under natural icing environments was developed based on these findings, with the goal of increasing power generation and mitigate structural loading, particularly under operational- and stopped-icing phases.

FIG. 1 is a conceptual diagram illustrating an example system 10 that includes a control system 12 and a wind turbine 14, in accordance with one or more techniques of this disclosure. This disclosure describes techniques that may mitigate the effects of icing events on wind turbines, such as wind turbine 14. As shown in the example of FIG. 1, wind turbine 14 includes blades 16A, 16B, and 16C (coll9ectively, "blades 16"), a nacelle 18, and a tower 20. In other examples, wind turbine 14 may include more or fewer blades. In some examples, wind turbine 14 is a 2.5 MW variable-speed, variable-pitch wind turbine. In other examples, wind turbine 14 may be another type of wind turbine. Wind turbine 14 may be a horizontal axis wind turbine. Wind turbine 14 may be an onshore or offshore wind turbine. Wind turbine 14 may be a utility-scale wind turbine or a non-utility scale wind turbine.

Control system 12 may be a computing system that comprises one or more computing devices. In some examples, one or more computing devices of control system 12 are included in wind turbine 14. In some examples, such as the example of FIG. 1, one or more computing devices of control system 12 are at locations separate from wind turbine 14. In some examples, some computing devices of control system 12 are included in wind turbine 14 and other computing devices of control system 12 are at locations separate from wind turbine 14. The computing devices of control system 12 may include server devices, personal computers, special-purpose computing devices, or other types of computing devices.

Wind turbine 14 may operate according to four or more phases: a pre-icing phase, an operational-icing phase, a stopped-icing phase, and a post-icing phase. As described herein, according to the control techniques applied by control system 12, wind turbine 14 may enter the pre-icing phase when meteorological icing occurs but there are no detectable effects the wind turbine operation. Wind turbine 14 may enter an operational-icing phase after the icing event begins to affect normal operation of wind turbine 14. Wind turbine 14 may enter the stopped-icing phase from the operational-icing phase during the icing event. Wind turbine 14 stops during the stopped-icing phase. Wind turbine 14 may enter the post-icing phase after ice has stopped accumulating on blades 16 of wind turbine 14 due to the icing event. For instance, wind turbine 14 may enter the post-icing phase from the static icing phase. In some examples with light ice accretion, wind turbine 14 may enter the post-icing phase from the operational-icing phase.

Control system 12 may determine that wind turbine 14 enters the pre-icing phase based on data, such as weather forecasts or other meteorological data, that indicate there is a sufficient probability that an icing event will affect the wind turbine within an upcoming time period. In various examples, the upcoming time period may be one of several durations, such as 1 hour, 2 hours, 3 hours, etc. When wind turbine 14 is in the pre-icing phase, wind turbine 14 may generate baseline power production data that associates electrical power production of wind turbine 14 with wind speed. Wind speed may be determined based on an anemometer positioned on wind turbine 14 (e.g., nacelle 18 or tower 20 (i.e., a pylon of wind turbine 14). Wind turbine 14 may continue to generate electricity while wind turbine 14 is in the pre-icing phase. When wind turbine 14 is in the pre-icing phase, blades 16 of wind turbine 14 may have angles of attack associated with the maximum lift-to-drag ratios that are optimal for power production.

According to the control techniques applied by control system 12, the phase of wind turbine 14 may change from the pre-icing phase to the operational-icing phase when the icing event begins to affect wind turbine 14. When the icing event begins to affect wind turbine 14, ice may begin to accumulate on blades 16 of wind turbine 14. Ice accumulation accreted over the suction surfaces of blades 16 may have serious detrimental effects on their aerodynamic performance. More specifically, the accumulated ice reduces the lift force and increase the drag force as the inflow passes blades 16. As a result, blades 16 may rotate slower, and wind turbine 14 generates less electricity as ice accumulates on the suction surfaces of blades 16 for the same wind speed. Accordingly, control system 12 may determine that the icing event has started to affect wind turbine 14 if the power produced by wind turbine 14 has decreased for a given wind speed as compared to the power produced by wind turbine 14 for the given wind speed as indicated by the baseline power production data.

When wind turbine 14 enters the operational-icing phase, wind turbine 14 may adjust the angle of attack of blades 16 of wind turbine 14 via changing the blade pitch angle. For instance, wind turbine 14 may increase the angle of attack of blades 16. Increasing the angle of attack of blades 16 tends to reduce the amount of ice that accumulates on the suction surfaces of blades 16. Increasing the angle of attack of blades 16 may increase the amount of ice that accumulates on the pressure surfaces of blades 16, but ice accumulation on the pressure surfaces of blades 16 tends to have a smaller effect on the aerodynamic properties than ice accumulation on the suction surfaces of blades 16. Wind turbine 14 may continue to generate electricity when wind turbine 14 is in the operational-icing phase.

However, even after adjusting the angle of attack of blades 16, ice may continue to accumulate on the suction surfaces of blades 16, which may further diminish the rotation speed of blades 16 for a given wind speed, which further diminishes the power production of wind turbine 14. Accordingly, as control system 12 detects further decreases in the power production of wind turbine 14 for a given wind speed, wind turbine 14 may further adjust (e.g., increase) the angle of attack of blades 16. In some examples, wind turbine 14 may increase the angle of attack of blades 16 in 1° increments. Thus, while wind turbine 14 is in the operational-icing phase, control system 12 may determine a modified angle of attack of blades 16 of wind turbine 14 based on a current wind speed, current power production of wind turbine 14, and the baseline power production data and wind turbine 14 may modify the angle of attack of blades 16 of wind turbine 14 to the modified angle of attack of blades 16 of wind turbine 14. As ice accumulates and as the angle of attack of blades 16 increases, the lift provided by the inflowing wind to blades 16 decreases and the rotation of blades 16 slows, which decreases power production of wind turbine 14.

Thus, in accordance with a technique of this disclosure, based on a determination that electrical power generation of wind turbine below a threshold, the phase of wind turbine 14 may change to a stopped-icing phase. The threshold may correspond to a minimum amount of power production or otherwise a small amount of power production. Thus, wind turbine 14 may change to the stopped-icing phase if the power production is 0. Rotation of blades 16 of wind turbine 14 is effectively halted when wind turbine 14 is in the stopped-icing phase. In some examples, when wind turbine 14 enters the stopped-icing phase, wind turbine 14 may further modify the angle of blades 16. For instance, when wind turbine 14 enters the stopped-icing phase, wind turbine 14 may turn the trailing edges of blades 16 of wind turbine 14 toward a windward direction.

When transitioning to the stopped-icing phase, wind turbine 14 may increase the angle of attack of blades 16 to the point where the flow stall conditions at the suction sides of blades 16. Wind turbine 14 may increase the angle of attack by changing the pitch angle of blades 16. The angle of attack where the flow is in stall condition at the suction sides of blades 16 is referred to as the stall angle hereafter. At the point, wind passing blades 16 no longer generates sufficient lift to cause the rotation of blades 16. As a result, rotation of blades 16 of wind turbine 14 may halt and power production may drop to zero. However, during the operational-icing phase, the angle of attack of blades 16 is not increased to the stall angle. The effective stall angle may differ depending on the amount of ice that has accumulated on blades 16 of wind turbine 14. Stopping rotation of blades 16 may also be achieved by orienting the trailing edges of blades 16 toward the direction of inflowing wind, e.g., by further changing the pitch angles of blades 16 or by changing a yaw angle of wind turbine 14 by approximately 180°.

Ice may continue to accumulate on blades 16 of wind turbine 14 while wind turbine 14 is in the stopped-icing phase. However, the accumulated ice is less likely to cause damage to wind turbine 14 because blades 16 are not rotating when wind turbine 14 is in the stopped-icing phase. Moreover, because of the adjusted angles of the blades when wind turbine 14 is in the stopped-icing phase, the total amount of ice that accumulates on blades 16 may be less than if wind turbine 14 did not adjust the angles of blades 16.

If wind turbine 14 is in the operational-icing phase and control system 12 determines that the power generation levels of wind turbine 14 are returning to the baseline power generation levels, this may mean that the ice load on blades 16 is diminishing (e.g., because the ice is melting or falling off). Accordingly, wind turbine 14 may reduce the angle of attack of blades 16 of wind turbine 14 to their designed values. In other words, wind turbine 14 may reduce the angle of attack of blades 16 to an angle that is optimal for power generation given current wind inflow conditions. Eventually, if the power generation levels fully return to the baseline power generation levels, wind turbine 14 may transition to a pre-icing phase, or a phase that is not associated with an icing event.

Wind turbine 14 may transition from the stopped-icing phase to a post-icing phase after the icing event has ended. When wind turbine 14 is in the post-icing phase, wind turbine 14 may perform actions to reduce the amount ice that has accumulated on blades 16 of wind turbine 14. For example, wind turbine 14 may adjust the angles of blades 16 so that the suction surfaces or the leading edges of blades 16 are directed toward the sun, which may promote melting of the ice.

In some examples, control system 12 may determine that the icing event has begun or ended based on loading information regarding blades 16 of wind turbine 14. For instance, in some examples, control system 12 may obtain the loading information from at least one of: a torque sensor configured to detect torque produced by blades 16 of wind turbine 14, or one or more thrust sensors configured to detect force acting on the rotor of wind turbine 14, or blade strain gauges or accelerometers to detect the blade structural responses, or tower strain gauges or accelerometers to detect the tower structural responses. For instance, in this example, control system 12 may determine that the icing event has begun based on the torque sensor detecting that torque produced by blades 16 or wind turbine 14 has diminished relative to a baseline torque level for the current inflowing wind speed. In some examples, control system 12 may determine that the icing event has ended based on the torque sensor detecting that torque produced by blades 16 of wind turbine 14 has increased to baseline torque levels due to reduction of the ice that has accumulated on blades 16 so that the inflowing wind is again producing lift as the inflowing wind passes blades 16. The thrust sensors may detect less loads acting on the turbine rotor when there is less ice on the blades. Thus, control system 12 may determine that the icing event has started based on the thrust sensors detecting increased loads on the turbine rotor and may determine that the icing event has ended based on the thrust sensors detecting decreased loads on the turbine rotor. The blade strain gauges, or accelerometers may detect the variations in the blade deflections due to blade ice accretion. Thus, control system 12 may determine that the icing event has started based on the blade strain gauges detecting increased blade deflection and may determine that the icing event has ended based on the blade strain gauges detecting decreased blade deflection. The tower strain gauges, or accelerometers may detect the increased imbalance due to turbine ice accretion. Thus, control system 12 may determine that the icing event has started based on the tower strain gauges detecting increased imbalance and may determine that the icing event has ended based on the blade strain gauges detecting decreased imbalance. The variations in the natural frequencies of the turbine blade or tower structures may be used for the detection of ice accumulation or ice melting. Control system 12 may determine that the icing event has started or ended based on one or more combinations of such loading information. For example, control system 12 may determine that the icing event has started or ended based on two or more of the types of loading information indicating that the icing event has started or ended.

As a result of applying the techniques of this disclosure, less ice may accumulate on blades 16 while wind turbine 14 is in the operational-icing and stopped-icing phases. The recovery time of the post-icing phase may be shortened. This may enable wind turbine 14 to return to normal operation faster. Moreover, wind turbine 14 may continue to generate electricity while wind turbine 14 is in the pre-icing and operational-icing phases. Furthermore, application of the techniques of this disclosure may reduce wear-and-tear on wind turbine 14. In some examples, it is not necessary to install any new hardware in wind turbine 14 to apply the techniques of this disclosure.

Advantages of the techniques of this disclosure over other existing methods may include economic advantages related to highly competitive installation costs (e.g., in some examples, no extra device/material required), operation cost (e.g., in some examples, minimal power consumption), and maintenance costs (e.g., in some examples, only for control strategy upgrade). The techniques of this disclosure may have high adaptability and adoptability because the techniques of this disclosure are usable not only for new installations but can be readily retrofitted to existing turbines and may be easy to implement at wind farms at different scales. Furthermore, the techniques of this disclosure may have low safety concerns: no overheating issues (thermal-based methods), no lightning protection system required (thermal-based methods and plasma methods), no durability issues (coatings and thermal-based methods), no electromagnetic interference (plasma methods).

Figure 2:
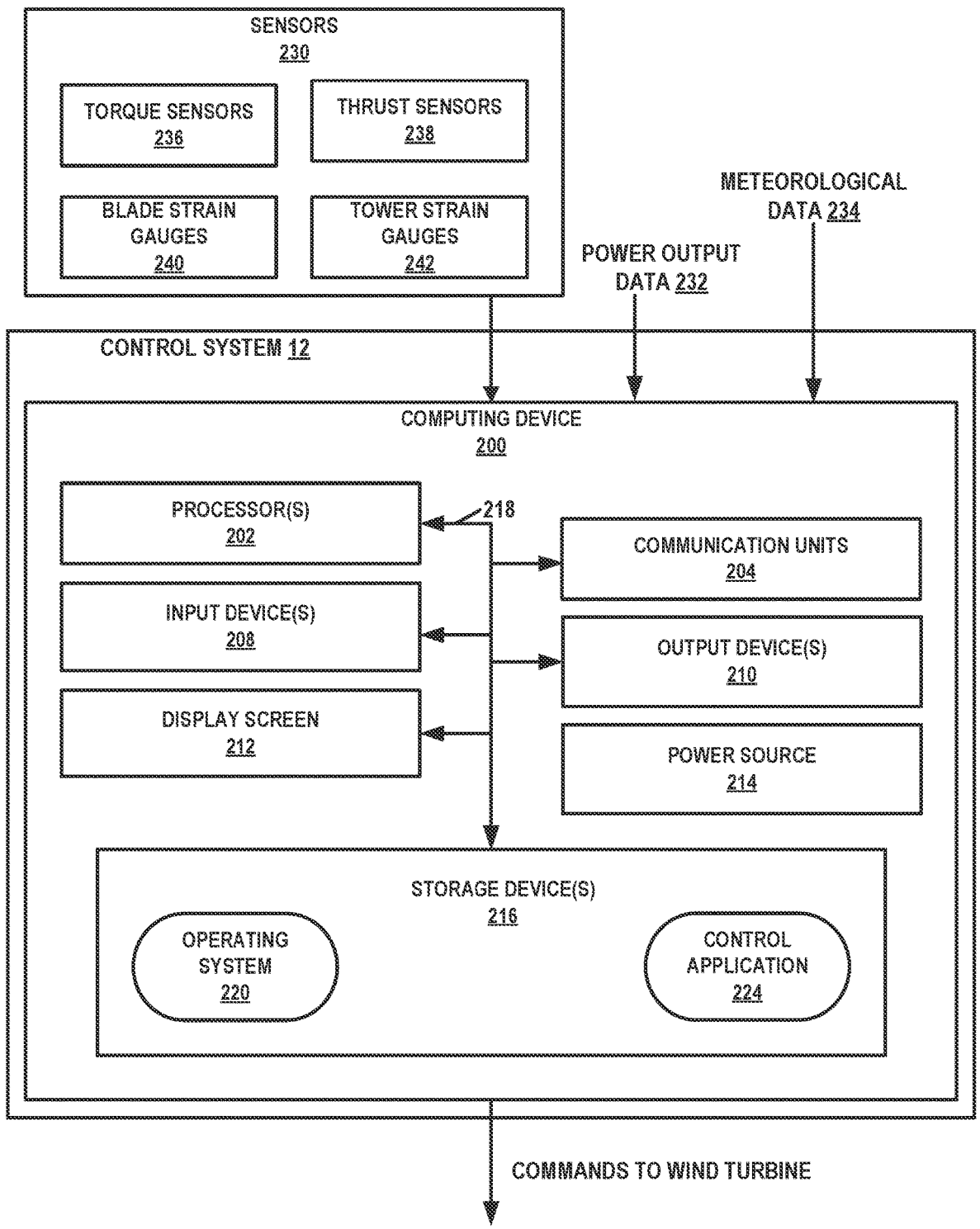
FIG. 2 is a block diagram illustrating example details of the control system, in accordance with one or more techniques of this disclosure.

FIG. 2 is a block diagram illustrating example details of control system 12, in accordance with one or more techniques of this disclosure. In the example of FIG. 2, control system 12 includes a computing device 200. In other examples, control system 12 may include more than one computing device and the functionality and components of computing device 200 may be distributed among the computing devices of control system 12.

In the example of FIG. 2, computing device 200 includes one or more processors 202, one or more communication units 204, one or more input devices 208, one or more output device(s) 210, a display screen 212, a power source 214, one or more storage device(s) 216, and one or more communication channels 218. Computing device 200 may include other components. For example, computing device 200 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source 214 may provide electrical energy to components 202, 204, 208, 210, 212 and 216.

Storage device(s) 216 may store information required for use during operation of computing device 200. In some examples, storage device(s) 216 have the primary purpose of being a short-term and not a long-term computer-readable storage medium. Storage device(s) 216 may include volatile memory and may therefore not retain stored contents if powered off. In some examples, storage device(s) 216 includes non-volatile memory that is configured for long-term storage of information and for retaining information after power on/off cycles. In some examples, processor(s) 202 of computing device 200 may read and execute instructions stored by storage device(s) 216.

Computing device 200 may include one or more input devices 208 that computing device 200 uses to receive user input. Examples of user input include tactile, audio, and video user input. Input device(s) 208 may include presence-sensitive screens, touch-sensitive screens, mice, keyboards, voice responsive systems, microphones, motion sensors capable of detecting gestures, or other types of devices for detecting input from a human or machine.

Communication unit(s) 204 may enable computing device 200 to send data to and receive data from one or more other computing devices (e.g., via a communication network, such as a local area network or the Internet). In some examples, communication unit(s) 204 may include wireless transmitters and receivers that enable computing device 200 to communicate wirelessly with the other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing device 200 may use communication unit(s) 204 to communicate with one or more hearing instruments (e.g., hearing instruments 102 (FIG. 1, FIG. 2)). Additionally, computing device 200 may use communication unit(s) 204 to communicate with one or more other devices. For instance, one or more of communication unit(s) 204 may be configured to communicate with one or more controllers (e.g., blade pitch controllers, yaw controllers, general control systems, etc.) of wind turbine 14.

Output device(s) 210 may generate output. Examples of output include tactile, audio, and video output. Output device(s) 210 may include presence-sensitive screens, sound cards, video graphics adapter cards, speakers, liquid crystal displays (LCD), light emitting diode (LED) displays, or other types of devices for generating output. Output device(s) 210 may include display screen 212. In some examples, output device(s) 210 may include virtual reality, augmented reality, or mixed reality display devices.

Processor(s) 202 may read instructions from storage device(s) 216 and may execute instructions stored by storage device(s) 216. Execution of the instructions by processor(s) 202 may configure or cause computing device 200 to provide at least some of the functionality ascribed in this disclosure to computing device 200 or components thereof (e.g., processor(s) 202). As shown in the example of FIG. 2, storage device(s) 216 include computer-readable instructions associated with operating system 220 and a control application 224.

Execution of instructions associated with operating system 220 may cause computing device 200 to perform various functions to manage hardware resources of computing device 200 and to provide various common services for other computer programs. Control application 224 is an application that may be used to control one or more wind turbines, such as wind turbine 14.

In the example of FIG. 2, control application 224 may obtain one or more of sensor data from one or more sensors 230, power output data 232, and meteorological data 234. Example sensors may include torque sensors 236, thrust sensors 238, blade strain gauges 240, and tower strain gauges 242. Torque sensors 236 may be configured to detect torque produced by blades 16 of wind turbine 14. Thrust sensors 238 may be configured to detect forces acting on the rotor of wind turbine 14. Blade strain gauges 240 may be configured to detect variations in deflections of blades 16. Tower strain gauges 242 may be configured to detect variations in deflections of tower 20. The power output data may indicate a power output of wind turbine 14. Meteorological data may indicate meteorological conditions of wind turbine 14. Control application 224 may obtain the meteorological data from one or more sources, such as online weather forecast services, sensors connected to wind turbine 14, or sensors in the vicinity of wind turbine 14.

Control application 224 may cause wind turbine 14 to transition between phases depending on the sensor data, power output data, the meteorological data, and or other types of data. For instance, control application 224 may determine, based on sensor data and the meteorological data that an icing event has begun to affect wind turbine 14. Based on a determination that the icing event has begun to affect wind turbine 14, control application 224 may change a phase of wind turbine 14 to an operational-icing phase. Based on the power output data, control application 224 may determine whether the electrical power generation of the wind turbine is below a threshold. Based on a determination that electrical power generation of the wind turbine is below the threshold, control application 224 may change the phase of wind turbine 14 to a stopped-icing phase.

Figure 3:
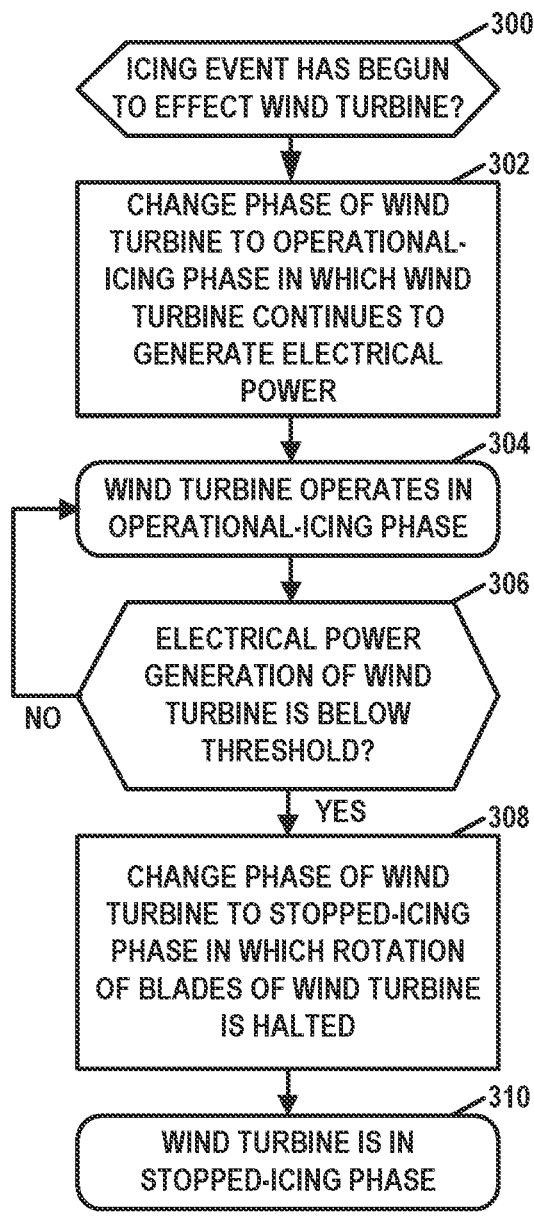
FIG. 3 is a flowchart illustrating a first example operation of the control system in accordance with one or more techniques of this disclosure.

FIG. 3 is a flowchart illustrating a first example operation of control system 12 in accordance with one or more techniques of this disclosure. The operations shown in the flowcharts of this disclosure are presented as examples. In other examples, the operations may include more, fewer, or different actions. Actions described in the flowcharts and elsewhere in this disclosure as being performed by control system 12 may be performed by control application 224 or may be performed in another way.

In the example of FIG. 3, control system 12 may determine that an icing event has begun to affect wind turbine 14 (300). Based on a determination that the icing event has begun to affect the wind turbine, control system 12 may change a phase of wind turbine 14 with the control system to an operational-icing phase (302). As part of changing a phase of wind turbine 14 to the operational-icing phase, control system 12 may cause wind turbine 14 to modify an angle of attack of blades 16 of wind turbine 14 via changing the blade pitch angle. Wind turbine 14 may continue to generate electrical power when wind turbine 14 is in the operational-icing phase. After changing the phase of wind turbine 14 to the operational-icing phase, wind turbine 14 may operate in the operational-icing phase (304).

Furthermore, while wind turbine 14 is in the operational-icing phase, control system 12 may determine whether electrical power generation of wind turbine 14 is below a threshold (306). If the electrical power generation of wind turbine 14 is not below the threshold ("NO" branch of 306), wind turbine 14 may continue to operate in the operational-icing phase (304). However, based on a determination that electrical power generation of the wind turbine is below the threshold ("YES" branch of 306), control system 12 may change the phase of wind turbine 14 to a stopped-icing phase (308) Wind turbine 14 may then operate in the stopped-icing phase (310). Rotation of blades 16 of wind turbine 14 is halted when wind turbine 14 is in the stopped-icing phase. In some examples, control system 12 may cause wind turbine 14 to change a yaw angle of wind turbine 14 so that the trailing edges of blades 16 face the inflowing wind. In some examples, control system 12 may cause wind turbine 14 to change the pitch of blades 16 so that the trailing edges of blades 16 face the inflowing wind.

Figure 4:
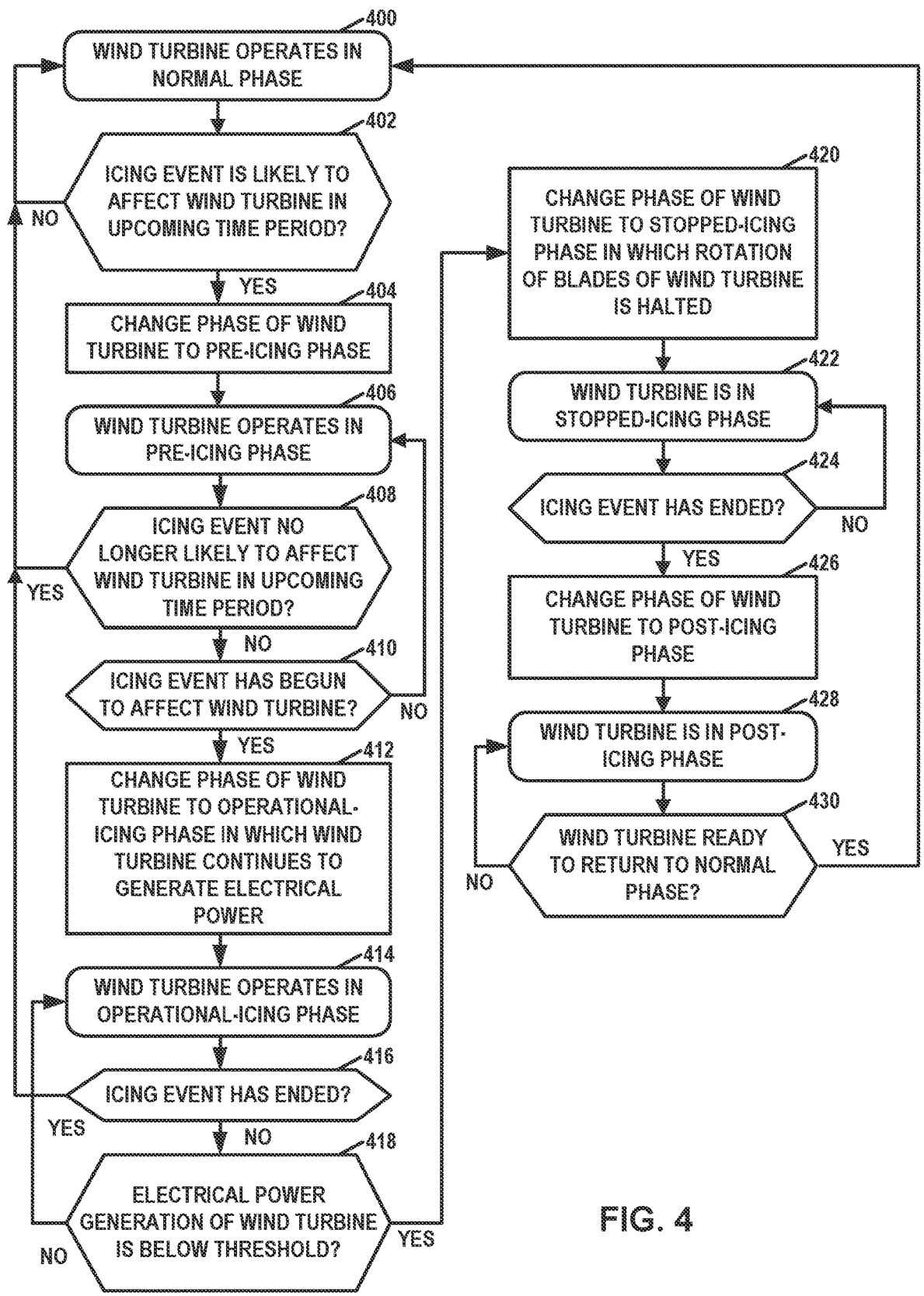
FIG. 4 is a flowchart illustrating a second example operation of the control system in accordance with one or more techniques of this disclosure.

FIG. 4 is a flowchart illustrating a second example operation of control system 12 in accordance with one or more techniques of this disclosure. In the example of FIG. 4, wind turbine 14 may initially operate in a normal phase (400). While wind turbine 14 is operating in the normal phase, the angle of attack of blades 16 and other operating parameters of wind turbine 14 may be optimized for electrical power production.

While wind turbine 14 is operating in the normal phase, control system 12 may determine whether an icing event is likely to affect wind turbine 14 in an upcoming time period (402). Control system 12 may perform this determination on a periodic or event driven basis. Control system 12 may determine that an icing event is likely to affect wind turbine 14 in the upcoming time period based on meteorological data 234. For instance, control system 12 may determine that an icing event is likely to affect wind turbine 14 in the upcoming time period based on temperature data, relative humidity data, precipitation data, and so on. For instance, in some examples, control system 12 may determine that an icing event is likely to affect wind turbine 14 in the upcoming time period based on control system 12 determining that meteorological data 234 indicates that the icing event will have a duration of greater than four hours. In some examples, control system 12 may make the determination regarding whether an icing event is likely to affect wind turbine 14 in the upcoming time period by determining a probability that an icing event is likely to affect wind turbine 14 in the upcoming time period. Control system 12 may then determine that the icing event is likely to affect wind turbine 14 in the upcoming time period if the probability is greater than a threshold.

If control system 12 determines that an icing event is unlikely to affect wind turbine 14 in the upcoming time period ("NO" branch of 402), wind turbine 14 may continue to operate in the normal phase (400). However, if control system 12 determines that an icing event is likely to affect wind turbine 14 in the upcoming time period ("YES" branch of 402), control system 12 may change the phase of wind turbine 14 to a pre-icing phase (404). Wind turbine 14 may then operate in the pre-icing phase (406). While wind turbine 14 is operating in the pre-icing phase, the angle of attack of blades 16 and other operating parameters of wind turbine 14 may continue to be optimized for electrical power production. However, additional data may be collected regarding wind turbine 14 while wind turbine 14 is operating in the pre-icing phase. For example, sensors 230 may collect data regarding the inflowing wind speed at nacelle 18 of wind turbine 14, data regarding relative humidity, data regarding whether there is precipitation, and/or other types of data. In some examples, when wind turbine 14 is in the pre-icing phase, wind turbine 14 may generate baseline power production data that associates electrical power production of wind turbine 14 with wind speed. Thus, prior to changing the phase of wind turbine 14 to the operational-icing phase and based on a determination that the icing event is likely to affect wind turbine 14 within an upcoming time period, control system 12 may change the phase of wind turbine 14 to the pre-icing phase. Wind speed may be determined based on an anemometer positioned on wind turbine 14 (e.g., nacelle 18 or tower 20 (i.e., a pylon of wind turbine 14)).

While wind turbine 14 is in the pre-icing phase, control system 12 may determine whether an icing event is no longer likely to affect wind turbine 14 in the upcoming time period (408). For example, control system 12 may determine, based on meteorological data 234 that the icing event is no longer likely to affect wind turbine 14 in the upcoming time period. For example, control system 12 may determine the icing event is no longer likely to affect wind turbine 14 in the upcoming time period based on current meteorological data 234 indicating that an icing event having a duration of more than four hours is not likely to occur. Based on a determination that the icing event is no longer likely to affect wind turbine 14 in the upcoming time period ("NO" branch of 408), control system 12 may change the phase of wind turbine 14 to the normal phase (400).

However, if the icing event is still likely to affect wind turbine 14 in the upcoming time period ("YES" branch of 410), control system 12 may determine whether an icing event has begun to affect wind turbine 14 (410). Control system 12 may determine that the icing event has begun to affect wind turbine 14 based on power output data 232 and data from one or more sensors, such as wind speed data from an anemometer, blade strain gauges (or accelerometers) configured to detect variations in the deflection of blades 16 of wind turbine 14, tower strain gauges (or accelerometers) configured to detect increased imbalance of wind turbine 14 due to ice accretion, torque sensors configured to detect torque produced by the blades of wind turbine 14, one or more thrust sensors configured to detect forces acting on blades 16 of wind turbine 14, etc. For instance, control system 12 may determine that the icing event has started to affect wind turbine 14 if the power produced by wind turbine 14 has decreased for a given wind speed as compared to the power produced by wind turbine 14 for the given wind speed as indicated by the baseline power production data. In some examples, control system 12 may determine that the icing event has started to affect wind turbine 14 if the temperature is less than a temperature threshold (e.g., 3°), the relative humidity is greater than a relative humidity threshold (e.g., greater than 85%), and precipitation is occurring. Example types of precipitation may include snow (e.g., light, regular, heavy, blowing etc.), freezing rain/drizzle, wintry mix, fog, haze, and so on. In some examples, control system 12 may determine that the icing event has begun based on loading information regarding blades 16 or tower 20 of wind turbine 14. In some examples, control system 12 may determine that the icing event has started to affect wind turbine 14 based on a weather forecast that indicates temperature, relative humidity, and precipitation consistent with an icing event. If control system 12 determines that the icing event has not begun to affect wind turbine 14 ("NO" branch of 410), wind turbine 14 may continue operating in the pre-icing phase (406).

However, if control system 12 determines that the icing event has begun to affect wind turbine 14 ("YES" branch of 410), control system 12 may change the phase of wind turbine 14 to an operational-icing phase (412). Wind turbine 14 may then operate in the operational-icing phase (414). While wind turbine 14 is operating in the operational-icing phase, wind turbine 14 may continue to generate electrical power. However, as described elsewhere in this disclosure, wind turbine 14 may adjust the angle of attack of blades 16 of wind turbine 14 via changing the blade pitch angle, which may reduce the amount of ice that accumulates on the suction surfaces of blades 16. For instance, wind turbine 14 may increase or decrease the angle of attack of blades 16 based on the electrical power generation of wind turbine 14. For instance, while wind turbine 14 is in the operational-icing phase, control system 12 may determine a modified angle of attack of blades 16 of wind turbine 14 based on a current wind speed, current power production of the wind turbine, and the baseline power production data. Control system 12 may cause wind turbine 14 to modify the angle of attack of blades 16 of wind turbine 14 to the modified angle of attack of blades 16 of wind turbine 14.

During deployment, control system 12 may cause wind turbine 14 to modulate the angle of attack ($\beta$) with a step of 1° to seek the relationship of blade pitching and aerodynamic penalty alleviation in each icing phase for Active Pitch Control (APC) algorithm development. In some examples, when wind turbine 14 initially enters the operational-icing phase, control system 12 may cause wind turbine 14 to adjust the angle of attack ($\beta$) by an initial amount (e.g., 1°). Additionally, control system 12 may calculate a power deficit that indicates a difference between current power production and predicted power production with no icing. For instance, control system 12 may calculate $\Delta P = P_{mea} - P_{no\text{-}icing}$, where $\Delta P$ is the power deficit, $P_{mea}$ is the current power production, and $P_{no\text{-}icing}$ is the predicted power production. In some examples, the predicted power production may be calculated as $P_{no\text{-}icing}(t) = c_1 U_{hub}(t)^9 + c_2 U_{hub}(t)^8 + \ldots + c_{10}$. This equation may represent the wind turbine power curve. In this equation, $\underline{U}_{hub}(t)$ represents the current speed of the inflowing wind at nacelle 18 the coefficients $c_1, c_2, \ldots c_{10}$ may be determined using polynomial fitting. In other examples, other numbers of coefficients may be used. Control system 12 may adjust the pitch angle of blades 16 in response to determining that the power deficit is greater than a first threshold (e.g., greater than 10% of the current power production) or the power deficit is greater than a second threshold (e.g., greater than 50 kW). In some examples, the amount by which control system 12 causes wind turbine 14 to adjust the angle of attack via setting offset to pitch angle ($\Delta \beta$) as a function of $\Delta P$ and the speed of the inflowing wind at nacelle 18 ($U_{hub}$). In other words, $\Delta \beta = f(\Delta P, U)$. The absolute value of $\Delta \beta$ may increase as $\Delta P$ increases (i.e., more power losses due to blade ice accretion) or U increases (higher inflow wind speed). In one example, control system 12 may modify $\Delta \beta$ based on $\Delta P$ and U. $\Delta \beta = 2°$ when $\Delta P = 200$ kW at $U_{hub} = 7$ m/s while $\Delta \beta = 3°$ when $\Delta P = 300$ kW at $U_{hub} = 7$ m/s. The values are just examples to demonstrate the concept. Such values may be turbine-dependent and may require field tests to determine the exact values for target turbines in terms of their capacity, power curve, and torque curve.

In some examples, control system 12 may evaluate whether to change the pitch angles of blades 16 on a periodic basis (e.g., once every 5, 10, 15, etc.) seconds/minutes while wind turbine 14 is in the operational-icing phase.

While wind turbine 14 is in the operational-icing phase, control system 12 may determine whether the icing event has ended (416). In some examples, control system 12 may determine that the icing event has ended based on the electrical power generation of wind turbine 14 being at the baseline power generation level for the current wind speed for at least a given time period. The power generation of wind turbine 14 may return to the baseline power generation level if ice is no longer present on blades 16. If control system 12 determines that the icing event has ended ("YES" branch of 416), control system 12 may change wind turbine 14 to the normal operating phase 400.

However, if the icing event has not ended ("NO" branch of 416), control system 12 may determine whether electrical power generation of wind turbine 14 is below a threshold for a current wind speed (418). For example, control system 12 may determine whether electrical power generation of wind turbine 14 is equal to 0. Control system 12 may determine whether the electrical power generation of wind turbine 14 is below the threshold based on power output data 232 obtained by control system 12 and sensor data indicating the wind speed. If the electrical power generation of wind turbine 14 is not below the threshold ("NO" branch of 418), wind turbine 14 may continue to operate in the operational-icing phase (414).

If control system 12 determines that the electrical power generation of wind turbine 14 is below the threshold for the current wind speed ("YES" branch of 418), control system 12 may change the phase of wind turbine 14 to a stopped-icing phase in which rotation of blades 16 of wind turbine 14 is halted (420). Wind turbine 14 may then operate in the stopped-icing phase (422). In some examples, rotation of blades 16 of wind turbine 14 is halted when the angle of attack of blades 16 of wind turbine 14 reaches a stall angle. In some examples, based on wind turbine 14 entering the stopped-icing phase, control system 12 may cause wind turbine 14 to turn trailing edges of blades 16 of wind turbine 14 toward a windward direction. This may reduce further ice accumulation on the suction surfaces of blades 16. In some examples, control system 12 may cause wind turbine 14 to change a yaw angle to that the trailing edges of blades 16 face toward the windward direction.

While wind turbine 14 is in the stopped-icing phase, control system 12 may determine whether the icing event affecting wind turbine 14 has ended (424). Control system 12 may determine whether the icing event has ended based on meteorological data 234 and/or data from sensors 230. For instance, control system 12 may determine that the icing event has ended based on loading information regarding blades 16 or tower 20 of wind turbine 14. In some examples, control system 12 may determine that the icing event has ended based at least in part on meteorological data indicating that the icing event has stopped.

If control system 12 determines that the icing event affecting wind turbine 14 has not yet ended ("NO" branch of 424), wind turbine 14 may continue to operate in the stopped-icing phase (422). However, if control system 12 determines that the icing event affecting wind turbine 14 has ended ("YES" branch of 420), control system 12 may change the phase of wind turbine 14 to a post-icing phase (426). Wind turbine 14 may then operate in the post-icing phase (428). While wind turbine 14 is operating in the post-icing phase, control system 12 may cause wind turbine 14 to perform various actions to reduce ice that may have accumulated on blades 16, such as using thermal techniques to melt the ice, turning suction surfaces toward the sun, and so on.

While wind turbine 14 is in the post-icing phase, control system 12 may determine whether wind turbine 14 is ready to return to the normal phase (430). For instance, control system 12 may determine that wind turbine 14 is ready to return the normal phase if the power production of wind turbine 14 is greater than 0 for a threshold amount of time (e.g., 30 minutes). If control system 12 determines that wind turbine 14 is not ready to return to the normal phase ("NO" branch of 430), wind turbine 14 may continue operating in the post-icing phase (428). Otherwise, if control system 12 determines that wind turbine 14 is ready to return to the normal phase ("YES" branch of 430), control system 12 may change the phase of wind turbine 14 to the normal phase (400).

Figure 5A:
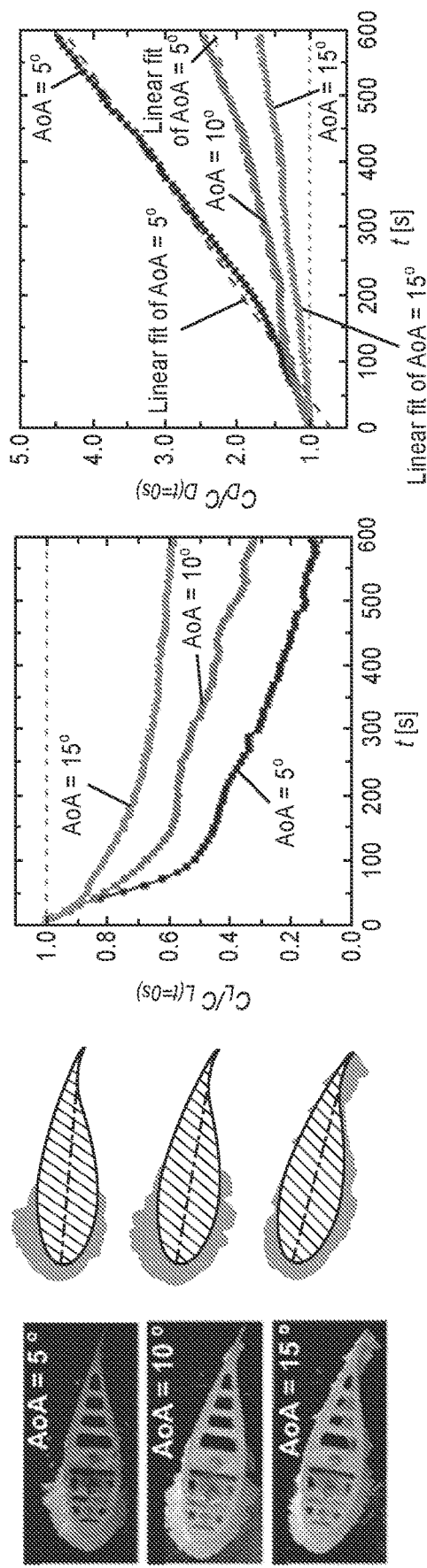
FIG. 5A and FIG. 5B show results in the laboratory and field for wind turbine icing study.
Figure 5B:
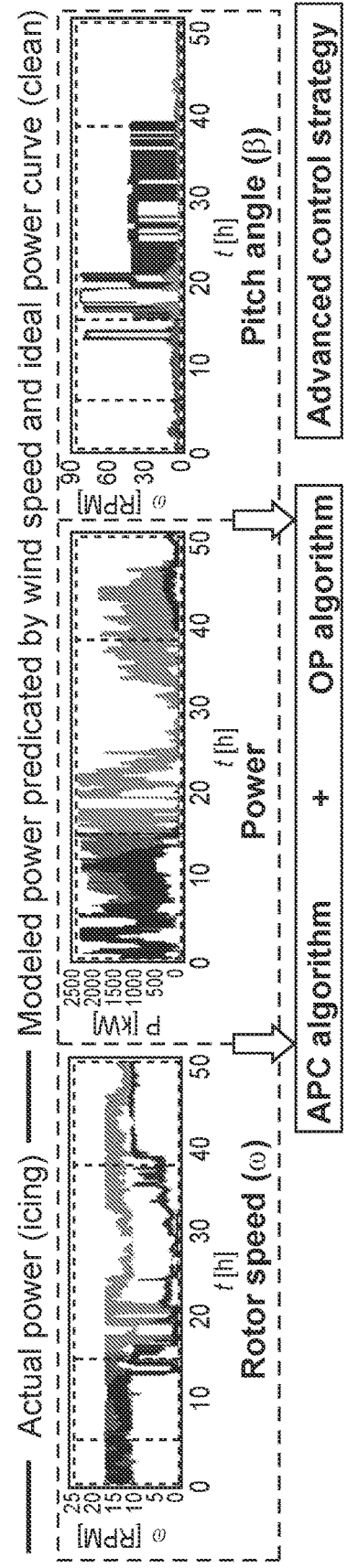
Figure 6A:
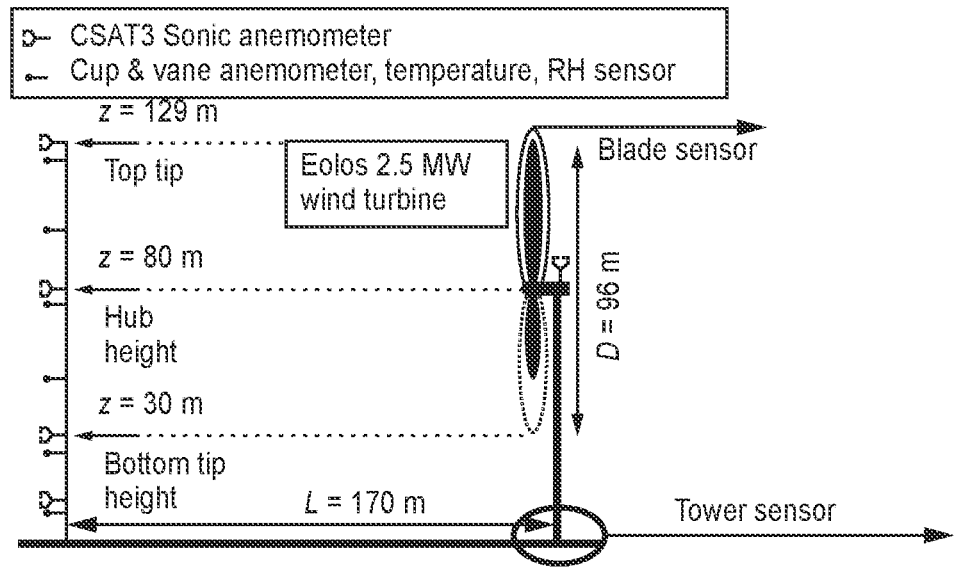
FIG. 6A illustrates the schematics of a 2.5 MW wind turbine and met tower that was used in this study.
Figure 6B:
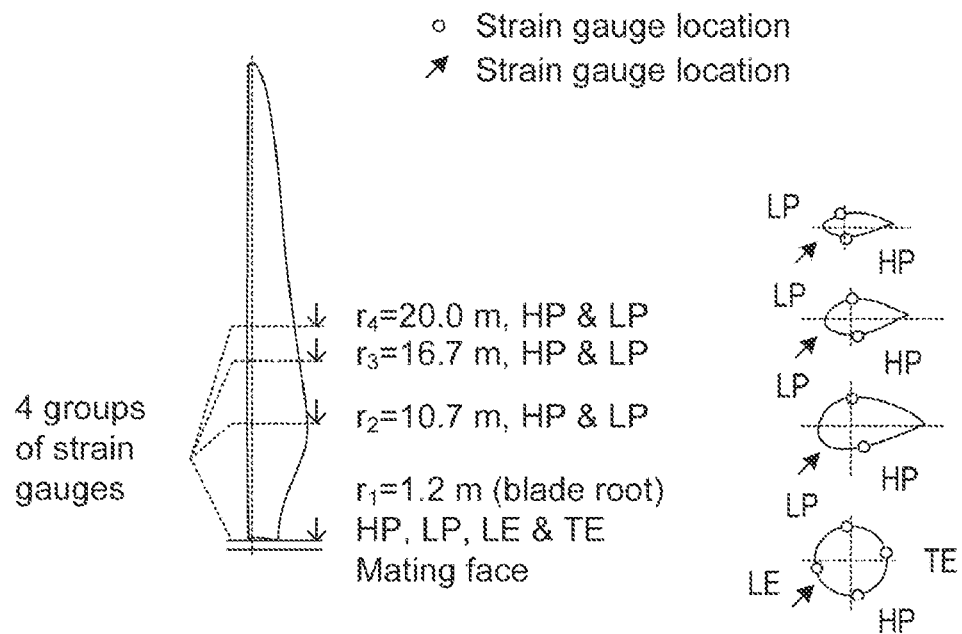
FIG. 6B illustrates example locations of blade strain gauges installed at a blade root.

FIG. 5A and FIG. 5B show results in the laboratory and field for wind turbine icing study. Specifically, FIG. 5A illustrates lab-scale support of the feasibility of active pitch control (APC) for icing mitigation. Less ice accretion is observed over the suction-side surface of the blade at a higher angle of attack, compensating lift and drag penalty of ~50%. FIG. 6B illustrates field work on the identification of four icing phases of an icing event to provide support for advanced control strategy. The icing event for study is ultimately selected based on meteorological icing conditions (represented by the high-resolution wind speed, air temperature, and relative humidity (RH) measured by the meteorological tower), wind power loss (calculated based on turbine actual power, wind speed and ideal power curve), as well as the supplementary records/photos of turbine ice accretion (captured by one or more nacelle cameras). Rotor speed ($\omega$) and pitch angle ($\beta$) are suggested to be the main operational/control parameters that will be used to develop the advanced control strategy based on APC and operational stop (OP) for mitigating the loading impact and power reduction caused by blade icing.

The following describes a study associated with one or more techniques of this disclosure.

Figure 6C:
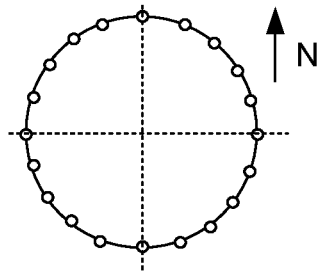
FIG. 6C illustrates a cross section of a tower system with 20 strain gauges installed as a tower base.
Figure 6D:
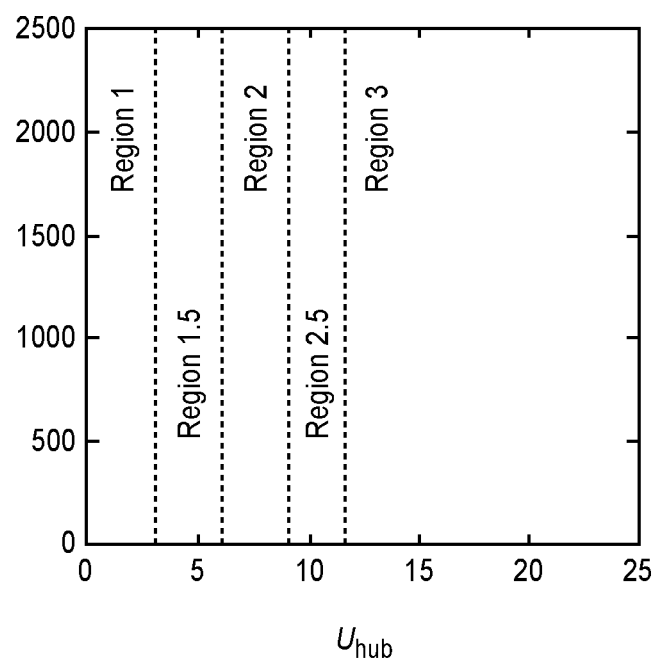
FIG. 6D illustrates a power curve of the wind turbine used in the study.

The study was conducted using a database from the Eolos station at the University of Minnesota in Rosemount, Minn., USA. FIG. 6A illustrates the schematics of a 2.5 MW wind turbine and met tower that was used in this study. FIG. 6B illustrates example locations of blade strain gauges installed at a blade root. FIG. 6C illustrates a cross section of a tower system with 20 strain gauges installed as a tower base. FIG. 6D illustrates a power curve of the wind turbine used in the study.

As shown in FIG. 6A, the station hosts a 2.5 MW upwind three-bladed horizontal-axis wind turbine (Clipper Liberty, C96) and a 130 m meteorological tower 170 m south to the turbine (referred to as met tower hereafter). This turbine is variable-speed variable-pitch (VSVP) regulated. The rotor diameter (D) and hub height (H) are 96 m and 80 m, respectively. The cut-in, rated, and cut-out wind speeds at hub height ($U_{hub}$) are ~4 m/s, 11 m/s, and 25 m/s, respectively. The turbine adopts different control strategies in three regions partitioned with the aforementioned three wind speeds, as shown in FIG. 6D. In Region 1 (i.e., $U_{hub}$<4 m/s), the turbine has no power generation. In Region 1.5 (i.e., 4 m/s≤$U_{hub}$≤6.9 m/s), Region 2 (i.e., 4 m/s≤$U_{hub}$≤11 m/s), and Region 2.5 (i.e., 9.2 m/s≤$U_{hub}$≤11 m/s), the turbine is generator torque-controlled with increasing rotor speed as the inflow wind speed increases. Region 2 refers to the most efficient turbine operational conditions with the maximum power coefficient ($C_{p, max}$) of 0.472. Region 1.5 and Region 2.5 correspond to the transitions between Region 2 and its neighbors. In Region 3 (i.e., $U_{hub}$>11 m/s), the turbine is full-span collective-pitch regulated to achieve stable rated power output. According to historical data at the Eolos station, the turbine has a higher probability of operating in Region 1.5-2.5 (>70%) than Region 3 (<5%) and Region 1 (~20%). The SCADA system records the turbine operational conditions at a sampling rate of 1 Hz. In addition, the turbine is instrumented with blade and tower sensor systems to measure the real-time structural response at a sampling rate of 20 Hz. All three blades are instrumented with the same setup of the blade sensors. For each blade, the blade sensor system includes four groups of fiber optic strain gauges (Micron Optics, os3200) installed at the different radial positions along the blade, i.e., blade root (RT), 25% R ($r_2$=10.7 m), 37.5% R ($r_3$=16.7 m), and 45% R ($r_4$=20.0 m), where R is the radius of the turbine rotor. Four strain gauges are installed over the high-pressure (HP) side surface, low-pressure (LP) side surface, leading-edge (LE) region, and trailing-edge (TE) region of the cross-section at the blade root, i.e., 1.2 m from the mating face, as shown in FIG. 6B. Six strain gauges are mounted over the HP and LP surfaces of the cross-sections at other outer radial positions. The tower sensor system consists of 20 single-axis strain gauges (Vishay MicroMeasurements, CEA-06-125UN-350/P2) evenly distributed around the tower base, as shown in FIG. 6C. Note that the working temperature for each strain gauge is simultaneously measured to compensate for the temperature effect on the strain measurement. More detailed information on the turbine blade and tower sensor systems are available in the previous publications using the Eolos database (Chamorro, L., Lee, S.-J., Olsen, D., Milliren, C., Marr, J., Arndt, R. E., Sotiropoulos, F., 2015. Turbulence effects on a full-scale 2.5 MW horizontal-axis wind turbine under neutrally stratified conditions. Wind Energy 18, 339-349. https://doi.org/10.1002/we.1700; Gao, L., Yang, S., Abraham, A., Hong, J., 2020b. Effects of Inflow Turbulence on Structural Deformation of Wind Turbine Blades. J. Wind Eng. Ind. Aerodyn. 199, 104137. https://doi.org/10.1016/j.jweia.2020.104137).

The met tower is mounted with velocity, temperature, and relative humidity (RH) sensors at multiple elevations to characterize local meteorological conditions. As shown in FIG. 6A, the sonic anemometers (Campbell Scientific, CSAT3) with a sampling rate of 20 Hz are installed at four elevations, i.e., 10 m, 30 m, 80 m, and 130 m, the latter three of which correspond to the turbine bottom blade tip, hub height and top blade tip, respectively. The cup and vane anemometers (Met One, 014-A) and temperature and RH sensors (Met One, 083-E) with a sampling rate of 1 Hz are installed at six elevations, four of which correspond to elevations three meters below those of sonic anemometers, i.e., 7 m, 27 m, 77 m. and 127 m. Two other elevations are 52 m and 102 m, which match the mid-spans of lower and upper blades, respectively.

The Selection of Icing Event

According to the ice classification standard from the International Energy Agency (IEA) (Lehtomaki, V., 2016. Wind Energy in Cold Climates Available Technologies—report), the Eolos station belongs to the IEA Ice class II site. Observations of turbine icing events have been reported from late October to early April at the station since its service started in 2011. Therefore, the nine-year Eolos database provides us opportunities to identify turbine icing events under standard meteorological icing conditions. For the present study, the icing event is selected using the following criteria. First, the ambient air temperature (T) is set to be lower than 3° C., and relative humidity (RH) is set to be higher than RH>85% to meet the meteorological icing conditions which are the prerequisite of turbine icing. It should be noted that the RH-based criterion is commonly used in the field studies Shu, L., Li, H., Hu, Q., Jiang, X., Qiu, G., McClure, G., Yang, H., 2018. Study of ice accretion feature and power characteristics of wind turbines at natural icing environment. Cold Reg. Sci. Technol. 147, 45-54. https://doi.org/10.1016/j.coldregions.2018.01.006) to present the combined effect of the liquid water content (LWC) level and medium volumetric diameter (MVD) than used in laboratory studies for identifying icing conditions. Second, the reduction of the power of 15% with respect to that produced under no-icing conditions is used as a threshold to detect icing events according to the literature. The power production under no icing conditions is modeled based on the real-time $U_{hub}$ and the turbine ideal power curve with an eighth-order polynomial fit. Note that the power reduction due to other factors, such as the power grid curtailment and turbine overheating issues, are excluded here based on the real-time power limit information. Third, considering the instrument glitches under field icing conditions (e.g., signal loss, met anemometer measurement failure, etc.), we only select the icing events with more than 95% of the time that all the instruments including the met tower, the turbine SCADA system, blade, and tower sensor systems are in normal operating conditions to ensure sufficient data for further analysis.

Figure 7A:
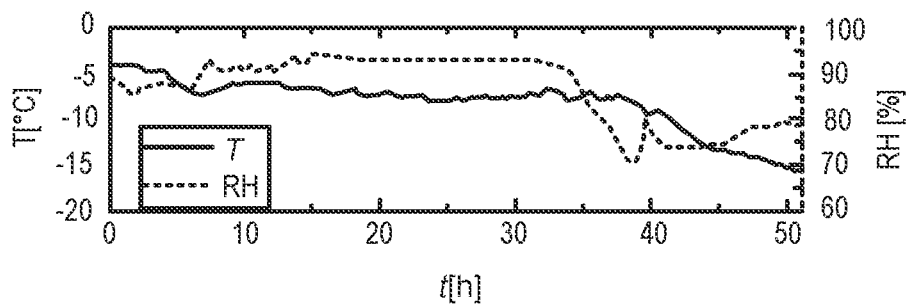
FIG. 7A shows a time series of air temperature (7) and relative humidity (RH).
Figure 7B:
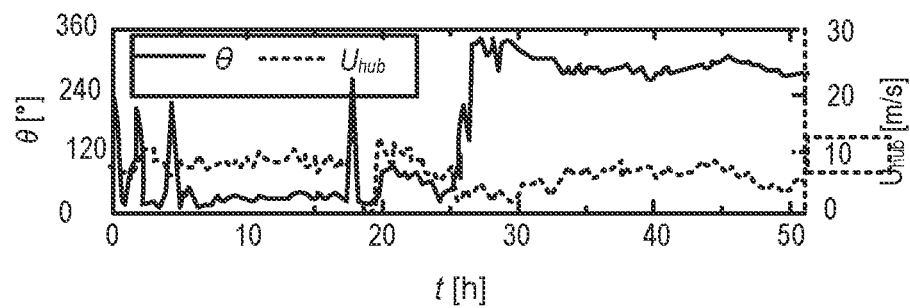
FIG. 7B shows wind speed at hub height ($U_{hub}$) and wind direction (θ) during the selected icing event with 10-min smoothed data.

Based on the criteria mentioned above, we examined the database using a sliding window approach with a window size of one hour and an advancing increment of 10 minutes to obtain all the candidate time periods of one hour. The candidate time periods adjacent in time are then combined to yield the time period of an icing event. Such a sliding window method has been widely used for data selection from the Eolos database. Note that for each identified icing event, we also expanded it backward in time to include the period when the meteorological icing conditions are met, but no power reduction is observed, and forward in time to include the time period that the turbine fully returns to its normal operation. Icing events with further confirmation according to the field observations of blade icing or icing fault log are topped in the selection. Finally, an icing event that lasts 51 hours in the period of 2018-02-19 8:00:00.000 to 2018-02-21 10:59:59.950 UTC was selected for the present study. FIG. 7A and FIG. 7B present the time series of the meteorology conditions, i.e., T, RH, $U_{hub}$ and wind direction ($\theta$), during this icing event. Specifically, FIG. 7A shows a time series of air temperature (T) and relative humidity (RH). FIG. 7B shows wind speed at hub height ($U_{hub}$) and wind direction ($\theta$) during the selected icing event with 10-min smoothed data. This event has a good correlation with the precipitation (snow) record, suggesting being a precipitation-icing event. The white appearance and tiny structures of the ice accreted over the blade surfaces, as well as the information of T and RH, imply the type of ice might be rime ice or mixed ice. As the figures show, the meteorological conditions are largely stationary in the selected icing event, except for a drop of T and RH after ~33 hours and a drastic change of wind direction of ~120° after 33 hours from the beginning of the icing event. It should be noted that the Eolos turbine automatically reorients towards the inflow winds via the adjustment in yaw angle. The averaged yaw error, i.e., the difference between the wind direction and nacelle direction, is small and negligible (0.6°).

Icing Phase Identification

Based on the variation of turbine operational conditions, we first divide an icing event into four phases, i.e., pre-icing, operational-icing, stopped-icing, and post-icing phases as below (illustrated in FIG. 8). Specifically, FIG. 8 is a schematic illustrating a variation of icing and turbine operational conditions during different phases of an icing event, i.e., pre-icing, operational-icing, stopped-icing, and post-icing.

Pre-icing phase: Turbine operation does not exhibit appreciable difference compared with those under no icing conditions even though meteorological icing conditions, i.e., T<3° C. and RH>85%, are satisfied according to literature (Fakorede et al., 2016).

Operational-icing phase: The turbine exhibits an appreciable reduction in power ($\Delta P$>15%) and rotor speed due to ice accretion but remains in operation.

Stopped-icing phase: The turbine generates no power (P=0 kW) and stays standstill/idling with blade feathering due to a significant amount of ice accretion on blades.

Post-icing phase: Turbine starts to generate power (P>0 kW) until its full recovery to regular operation as the remaining ice is completely removed through naturally melting or shedding/falling.

The icing phases may not occur strictly in sequential order in practice because the development of ice (i.e., accretion and melting) on a turbine is susceptible to changing meteorological conditions in the field.

Results and Discussion

Turbine Operational Variations

Figure 9A:
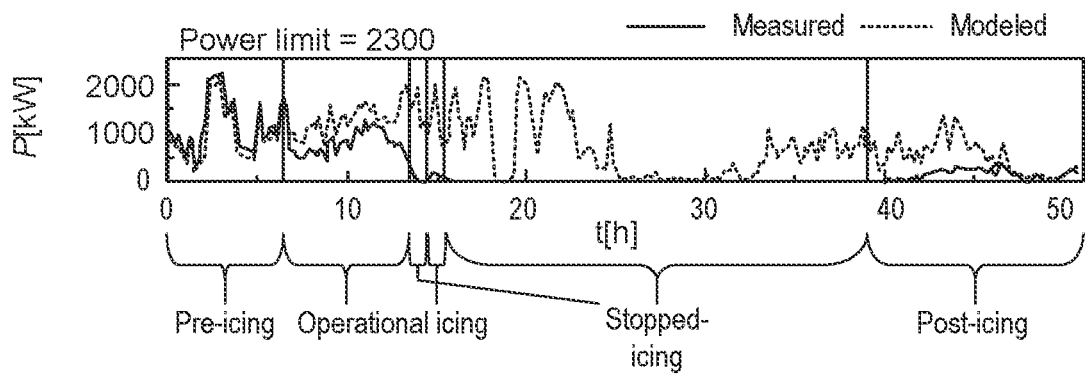
FIG. 9A is a chart showing time series data of the measured and modeled wind turbine power in four icing phases during a selected icing event.
Figure 9B:
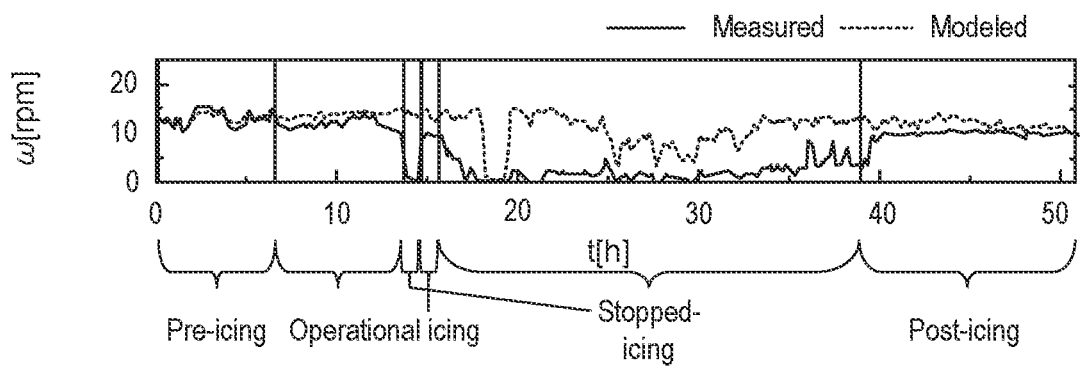
FIG. 9B is a chart showing time series data of the measured and modeled wind turbine rotor speed (ω) in four icing phases during the selected icing event.
Figure 9C:
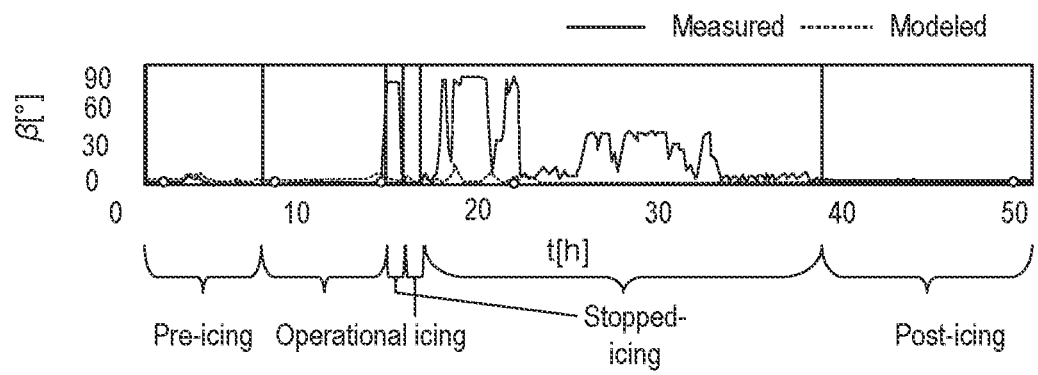
FIG. 9C is a chart showing time series data of the measured and modeled wind turbine pitch angle (β) in four icing phases during the selected icing event.

We first investigate the variation of the turbine operational parameters (i.e., power, rotor speed, and blade pitch) during the selected icing event in the present study, as shown in FIG. 9A, FIG. 9B, and FIG. 9C. FIG. 9A is a chart showing time series data of the measured and modeled wind turbine power in four icing phases during a selected icing event. FIG. 9B is a chart showing time series data of the measured and modeled wind turbine rotor speed ($\omega$) in four icing phases during the selected icing event. FIG. 9C is a chart showing time series data of the measured and modeled wind turbine pitch angle ($\beta$) in four icing phases during the selected icing event. According to the criteria described above, the event is divided into pre-icing (~6.5 hours), operational-icing (~8.5 hours), stopped-icing (~24 hours), and post-icing (~12 hours) phases based on a comparison of the measured and modeled turbine parameters. As the figure shows, in our selected event, the four icing phases take place generally in sequential order. However, though constituting only 5% of total time duration, an alternation between operational and stopped phases does occur at around $15^{th}$ hour of the event, as shown in a small surge of the measured power in FIG. 9A. Noticeably, the overall energy loss of the selected icing event, i.e., $\Delta E=\Sigma(P_{no-icing}-P_{mea})\Delta 6$, is approximately 25 MWh, i.e., 63% of the amount of energy to be generated (~40 MWh). For a 0.10 $/kWh contract, this energy loss is equivalent to a $2511 financial deficit for this event. The four phases mentioned above take account for 0%, 12%, 71%, and 17% of the total energy loss, respectively. The post-icing phase owns an even larger proportion than that of the operational-icing phase mainly due to its longer duration caused by the slow natural melting process.

The time series in FIGS. 9A, 9B, and 9C use 10-minute smoothed data. Note that the pitch angle here refers to the global pitch angle that has the same value at different radius positions and is commonly used and recorded in the SCADA dataset. The power production under no icing conditions is modeled based on the real-time $U_{hub}$ and the turbine ideal power curve with an eighth-order polynomial fit. Similar methods are used for the modeling of modeled rotor speed and pitch angle under no icing conditions. Different color bands mark different icing phases. The power limit has a constant value of 2.3 MW during the selected period. Note that the dots in FIG. 9C mark the locations of the sample datasets selected from each icing phase for further analysis.

To conduct further analysis of turbine operation and structural response under different icing phases, five sample datasets of one-duration each, denoted as P1, P2-I, P2-T, P3, and P4, are selected, as indicated by the dots in FIG. 9C. The one-hour duration guarantees not only sufficient data but also relatively stable inflow conditions, such as wind speed and wind direction, which allows us to conduct further analysis, especially the spectral analysis for turbine structures. It should be noted that the third sample dataset (P2-T) corresponds to the transition status between the operational and stopped-icing phases to shed light on the transient turbine behaviors as the turbine reaches its operational limit due to ice accretion. Table 1, below, summarizes the general meteorological and turbine operational information for each sample dataset. The temperature and RH in all datasets, except P4, satisfy the meteorological icing conditions. The lower temperature and RH in P4 suggests no more ice accretion during this period. The turbine operation follows the conventional control strategy in Region 2, Region 2, Region 2.5, Region 2.5, and Region 1.5 from P1 to P4, respectively. The rotor speed yields a reduction of 1% (P1, negligible), 14% (P2), 63% (P2-T), 88% (P3), and 5% (P4) while apparent increments in blade pitch angle are observed in P2-T and P3.

TABLE 1

Meteorological and turbine operational conditions of the selected one-hour datasets for different icing phases. Note that the information listed in the table is obtained through the one-hour average of measured and modeled data.

| Sample datasets | T [° C.] | RH [%] | $U_{hub}$/Region [m/s] | $\theta$ [°] | $\omega_{mea}$ [rpm] | $\omega_{no-icing}$ [rpm] | $\beta_{mea}$ [°] | $\beta_{no-icing}$ [°] |
|---|---|---|---|---|---|---|---|---|
| P1: Pre-icing | −4.2 | 88 | 7.1/Region 2 | 6 | 12.3 | 12.5 | 1 | 1 |
| P2-I: Operational-icing (Initial) | −6.7 | 92 | 7.7/Region 2 | 26 | 11.5 | 13.3 | 1 | 2 |
| P2-T: Operational-icing (Transition) | −6.3 | 92 | 10.1/Region 2.5 | 40 | 5.3 | 14.5 | 23 | 5 |
| P3: Stopped-icing | −7.5 | 93 | 10.6/Region 2.5 | 81 | 1.5 | 12.7 | 42 | 6 |
| P4: Post-icing | −15.5 | 79 | 5.2/Region 1.5 | 272 | 10.5 | 11.0 | 2 | 1 |

Figure 10A:
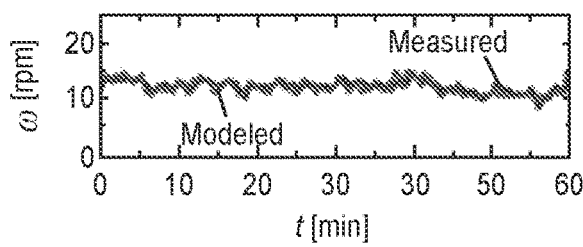
FIGS. 10A, 10B, 10C, 10D, and 10E present time series of the measured and modeled rotor speed (ω) and pitch angle (β) for each sample dataset.
Figure 10A:
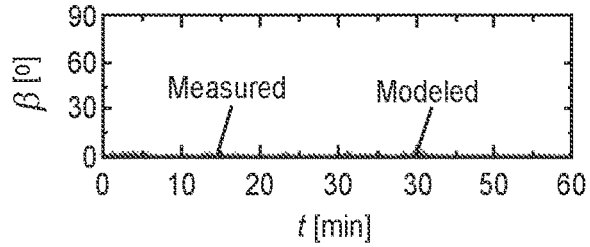
Figure 10B:
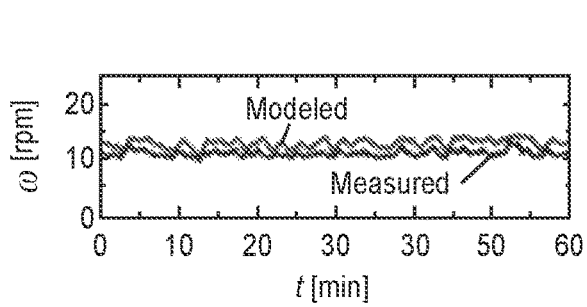
Figure 10B:
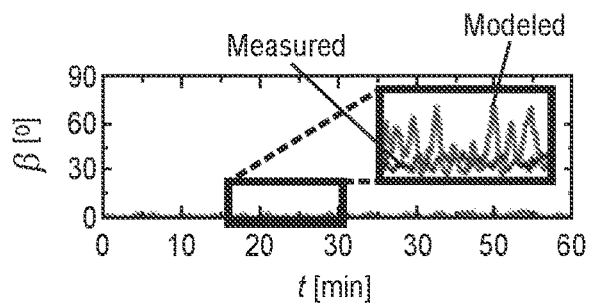
Figure 10C:
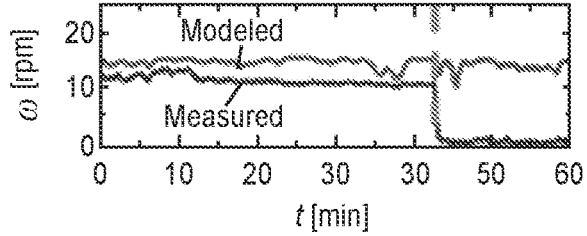
Figure 10C:
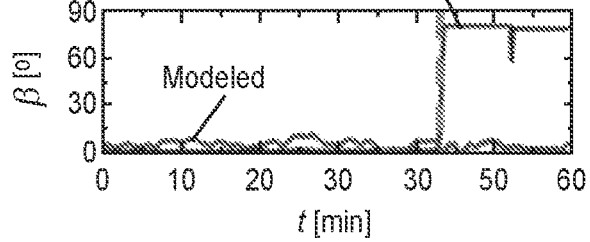
Figure 10D:
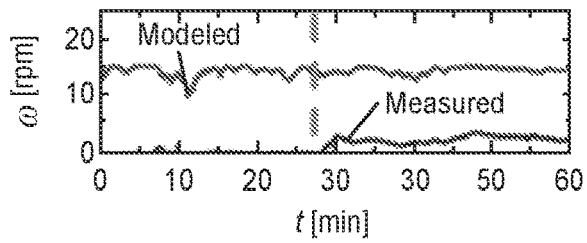
Figure 10D:
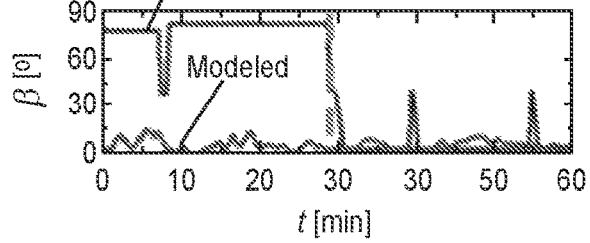
Figure 10E:
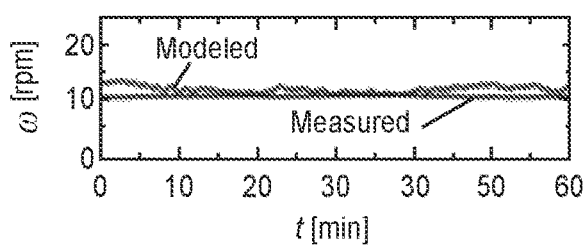
Figure 10E:
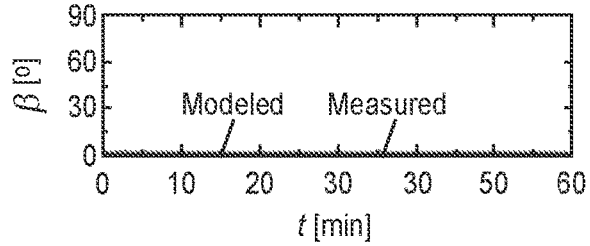

FIGS. 10A, 10B, 10C, 10D, and 10E present time series of the measured and modeled rotor speed ($\omega$) and pitch angle ($\beta$) for each sample dataset. Specifically, FIG. 10A presents time series of the measured and modeled rotor speed and pitch angle for data set P1. FIG. 10B presents time series of the measured and modeled rotor speed and pitch angle for data set P2-I. FIG. 10C presents time series of the measured and modeled rotor speed and pitch angle for data set P2-T. FIG. 10D presents time series of the measured and modeled rotor speed and pitch angle for data set P3. FIG. 10E presents time series of the measured and modeled rotor speed and pitch angle for data set P4.

In P1, the modeled and measured data for both $\omega$ and $\beta$ match very well based on the conventional control strategy of the wind turbine, confirming that there is no appreciable icing effect on turbine operation in the pre-icing phase. The turbine is in its regular operation with a small pitch angle of ~1°. In P2-I, the rotor speed exhibits a reduction of 15% (compared to the modeled value) after approximately 1.5-hour under icing conditions. Accordingly, as shown in the zoomed-in inset in FIG. 10B, the blade ice accretion in this period also causes a decrease of fluctuations in $\beta$, suggesting the turbine under operational icing conditions become less sensitive to inflow changes. During the P2-T, the $\omega$ and $\beta$ first show a similar reduction as those in P2-I observed. As soon as the turbine reaches its operational limit due to severe blade ice accretion, a sharp drop in $\omega$ and a rise in $\beta$ take place, indicating that the turbine makes a transition to idling mode to reduce the gained aerodynamic forces for safety concerns actively and confirmed with a fault alarm in the SCADA signals. In some circumstances, the sharp drop might be a consequence of the amount of the ice on the blade that would not allow generating enough torque, mainly due to a significant increase in drag. In P3 (i.e., during the stopped-icing phase), the turbine is in a standstill status with almost no blade rotation at the beginning. Later (i.e., ~28 minutes from the beginning), the turbine is observed to struggle to recover its operation indicated by a nonzero but small $\omega$. Such a change of operation is accompanied by a steep drop of $\beta$, which is likely to be caused by sudden blade load reduction associated with intermittent shed-off of ice chunks from the blades. This phenomenon is commonly observed in practical turbine operation due to the highly-varying icing conditions in the field. In P4 (i.e., during the post-icing phase), the $\beta$ quickly returns to its normal operating conditions while the $\omega$ still stays below its modeled value, potentially due to the remaining ice structures on turbine blades.

Figure 11C:
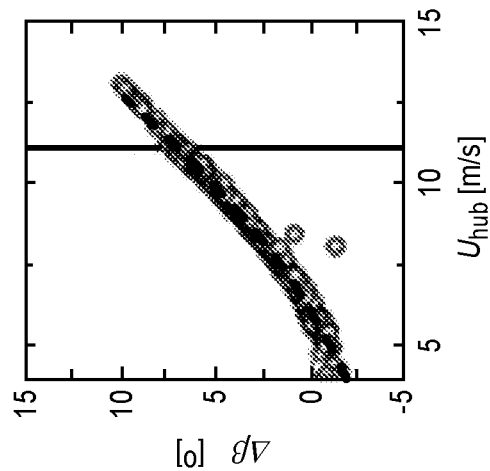
FIG. 11C is a chart showing the dependence of pitch angle deficit (Δβ) upon inflow wind speed ($U_{hub}$) for the data in P2-I.
Figure 11B:
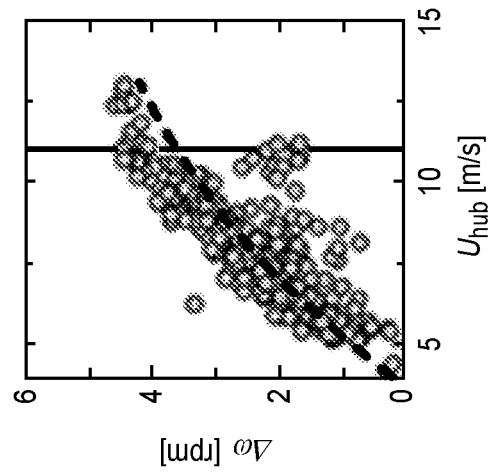
FIG. 11B is a chart showing the dependence of rotor speed deficit (Δω) on rotor speed deficit (Δω) for the data in P2-I.
Figure 11A:
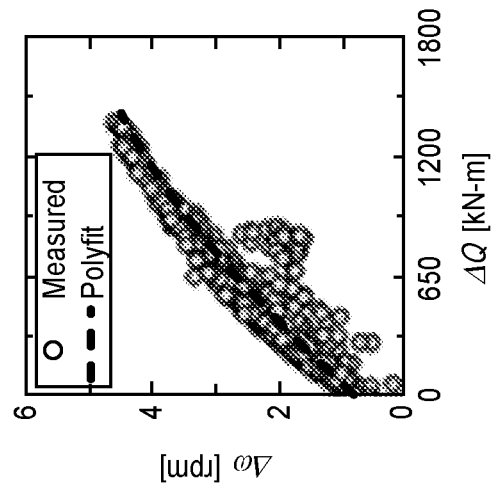
FIG. 11A is a chart showing the dependence of rotor speed deficit (Δω) on torque deficit (ΔQ) for the data in P2-I.

The information above suggests that $\omega$ and $\beta$ are useful indicators for ice detection though they have not been used as detection parameters in the literature. The reduction in $\omega$ is positively correlated to the decrease in rotor torque caused by the aerodynamic force changes and increased gravitational and centrifugal forces due to ice accumulation, as shown in FIG. 11A. This trend confirms that based on the conventional control strategy, $\omega$ is set to decrease to match the designed generator torque via prefab drivelines for a new stability. This conventional control strategy is suggested to be improved to avoid stops and keep the turbine operating for more power production, such as the "Operation with Ice" (OWI) strategy launched by Siemens Gamesa Renewable Energy (Siemens Gamesa Renewable Energy., 2019. Technology retrofit and service approach for performance optimazition in cold climates). The lower $\omega$ is also accompanied by a $\beta$ response that is less sensitive to the inflow changes. In addition, the reduction in $\omega$ and $\beta$ is found to be associated with the magnitude of inflow speed. As shown in FIG. 11B and FIG. 11C, the impact of turbine ice accretion on turbine operation, i.e., $\Delta\omega$ and $\Delta\beta$, escalates as the inflow speed increases.

FIG. 11A is a chart showing the dependence of rotor speed deficit ($\Delta\omega$) on torque deficit ($\Delta Q$) for the data in P2-I. FIG. 11B is a chart showing the dependence of rotor speed deficit ($\Delta\omega$) on rotor speed deficit ($\Delta\omega$) for the data in P2-I. FIG. 11C is a chart showing the dependence of pitch angle deficit ($\Delta\beta$) upon inflow wind speed ($U_{hub}$) for the data in P2-I. Note that $\Delta$ refers to the difference between the modeled and measured quantities, for example, $\Delta\omega = \omega_{mod} - \omega_{mea}$.

Power Reduction Evaluation

Figure 12A:
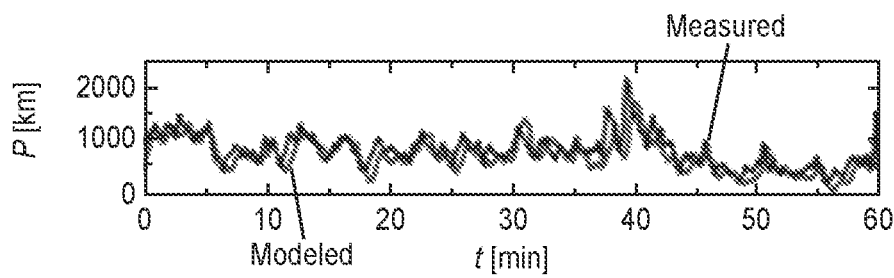
FIG. 12A is a chart showing time series data of the measured and modeled power for dataset P1.
Figure 12B:
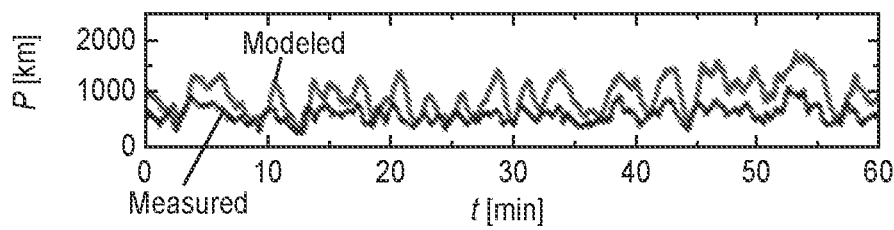
FIG. 12B is a chart showing time series data of the measured and modeled power for dataset P2-I.
Figure 12C:
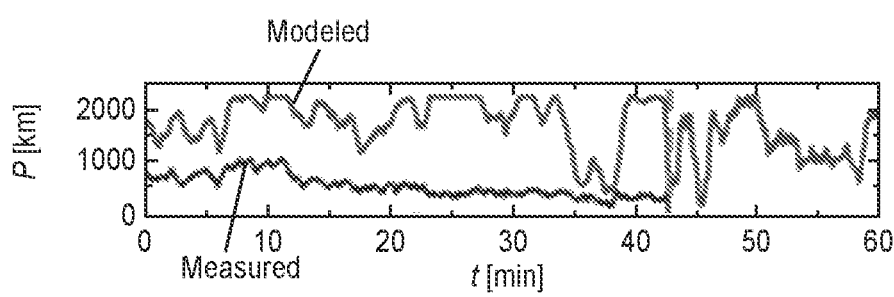
FIG. 12C is a chart showing time series data of the measured and modeled power for dataset P2-T.
Figure 12D:
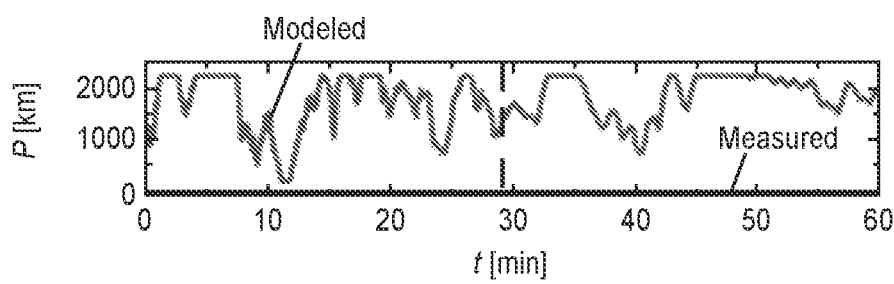
FIG. 12D is a chart showing time series data of the measured and modeled power for dataset P3.
Figure 12E:
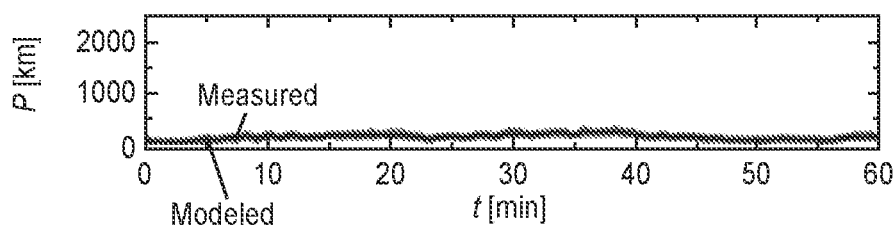
FIG. 12E is a chart showing time series data of the measured and modeled power for dataset P4.

In this section, the ice-induced power reduction is investigated in each icing phase using the dataset presented in the previous section. FIGS. 12A-12E show the time series of the measured and modeled power generation for the selected sample datasets. Specifically, FIG. 12A is a chart showing time series data of the measured and modeled power for dataset P1. FIG. 12B is a chart showing time series data of the measured and modeled power for dataset P2-I. FIG. 12C is a chart showing time series data of the measured and modeled power for dataset P2-T. FIG. 12D is a chart showing time series data of the measured and modeled power for dataset P3. FIG. 12E is a chart showing time series data of the measured and modeled power for dataset P4.

In P1, as shown in FIG. 12A, the measured power output matches closely with that of modeled power, showing no signs of icing impact in the pre-icing phase. In P2-I (i.e., after the 1.5-hour into the operational-icing phase), as shown in FIG. 12B, the signal of the measured power follows a similar trend as the modeled power. However, higher deficits occur, particularly in the time periods of higher power outputs with an average deficit close to 40%. Such value is higher than the power loss (i.e., ~35%) even after a 24-hour in-cloud icing period simulated by Etemaddar, M., Hansen, M. O. L., Moan, T., 2014. Wind turbine aerodynamic response under atmospheric icing conditions. Wind Energy 17, 241-265. https://doi.org/10.1002/we.1573. We attribute such discrepancy to the precipitation icing in the current study. Such an icing condition is often present in the field but has not been fully considered in most simulations. Compared with in-cloud icing conditions used in Etemaddar et al. (2014), precipitation ice can yield a significantly higher ice accretion rate on the turbine blade and thus result in more turbine power loss in a shorter period of time. As moving to P2-T (FIG. 12C), the power loss increases as expected, but the fluctuation of measured power dampens, particularly before the transition, potentially because the blades with increasing ice accretion become less responsive to the inflow changes. The sharp drop of the measured power from ~400 kW to zero observed at the transition indicates that the turbine alters its functional status as soon as it reaches the operational limit immediately according to the conventional control strategy. As shown in FIG. 12D, the measured power in P3 of the stopped icing phase stays zero despite changes in the turbine operation (i.e., $\omega$, $\beta$). In P4 near the end of the post-icing phase, the measured power matches well with the modeled values with a discrepancy of only 2% due to the remaining ice accretion on blades, as shown in FIG. 12E.

Figure 13A:
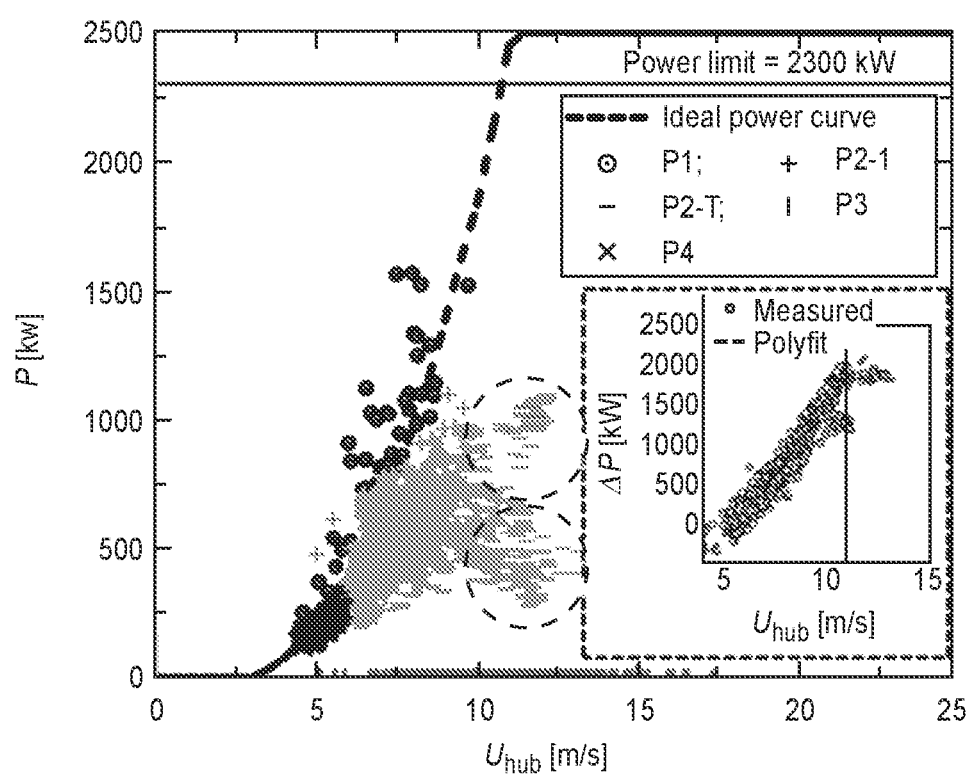
FIG. 13A compares the measured power in each sample datasets with the ideal power curve of the turbine.

FIG. 13A compares the measured power in each sample datasets with the ideal power curve of the turbine. In general, the measured power outputs in P1 and P4 oscillate around the ideal curve, and P3 has no power output. The measured power in P2-I and P2-T during the operational-icing phase are highly scattered but stays mostly below the curve. In comparison to that in P2-I, the distribution of measured power in P2-T (before the transition at ~42 min) shows a broad range of scattering corresponding to a larger fluctuation of power loss at different wind speeds. Especially at wind speeds higher than 11 m/s, the measured power ($P=\omega Q$) shows two clusters (circled in FIG. 13A) associated with the changing turbine operation (i.e., $\omega$ and $\beta$) and torque (Q) due to increasing blade ice accretion. The inset in FIG. 13A shows a strong correlation between power loss ($\Delta P$) and wind speed, in which more significant $\Delta P$ is observed at higher wind speeds. Such a trend is related to the correlation of $\Delta f$ and $\Delta P$ with inflow wind speed presented in FIG. 11B and FIG. 11C. The increase of $\Delta\omega$ and $\Delta\beta$ can lead to blade angle of attack (AoA) exceeding its designed values at higher wind speeds, causing a stall and other aerodynamic degradation at local blade sections and thus more severe power loss.

Figure 13B:
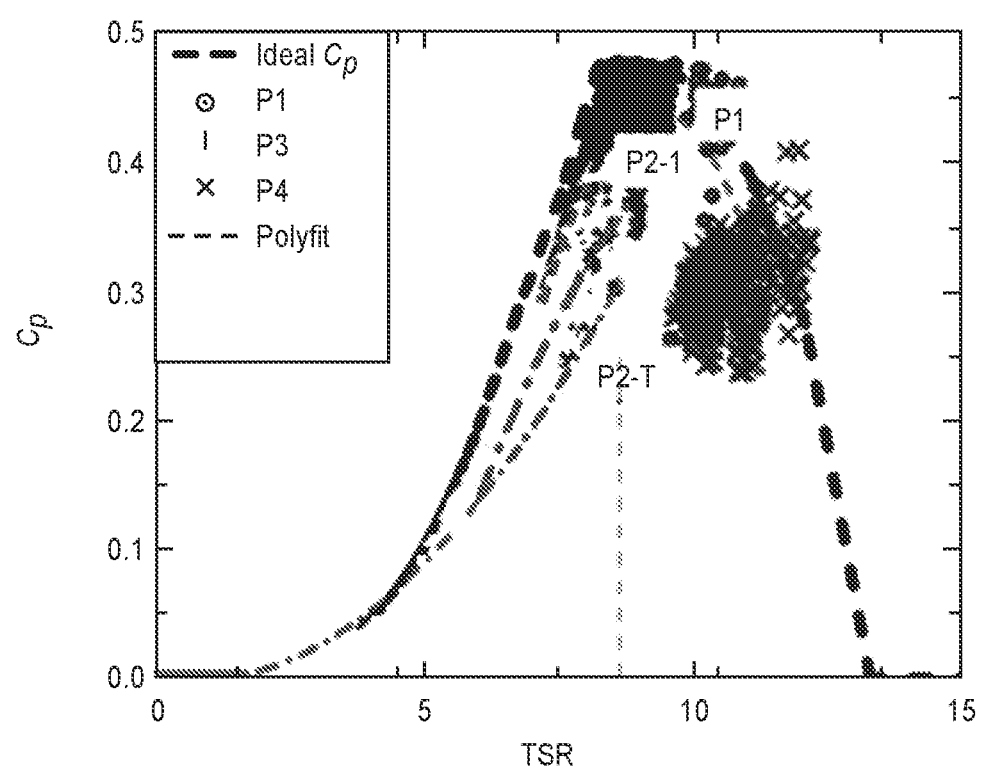
FIG. 13B shows power coefficient ($C_P$) as a function of tip speed ratio (TSR).

In FIG. 13A, power (P) and power deficit ($\Delta P$, inset plot) as a function of wind speed ($U_{hub}$). The gray circles mark the portion of data before (top) and after (bottom) ~12 min in P2-T. FIG. 13B shows power coefficient ($C_p$) as a function of tip speed ratio (TSR). The measured data for P1, P2-I, and P2-T are least-square fit with the second-order polynomial (shown as dashed-dotted lines in the figure) for comparison with the ideal $C_p$ curve. The dash line corresponds to the optimal TSR (i.e., $TSR_{opt}$).

FIG. 13B shows the non-dimensional power coefficient $$(C_p = P \Big/ \frac{1}{2}\rho A U_{hub}^3,$$

where A is the rotor projection area) as a function of the tip speed ratio (TSR=$\omega R/U_{hub}$, where R is the radius of the turbine rotor), which is widely used to assess the wind turbine performance in the literature. In P1, the measured $C_p$ scatters below the ideal curve, and as indicated by the polynomial fitting curve of the measured dataset, the discrepancy between the measured $C_p$ and ideal values at the corresponding TSRs is the highest at the optimal TSR of 8.3. These trends are largely due to the delay of turbine control in response to incoming flow change in practice. In P2-I and P2-T, $C_p$ degrades substantially due to the continuous ice accretion on turbine structures. The maximum degradations of $C_p$ observed at $TSR_{opt}$ for P2-I and P2-T are ~20% and ~30% in comparison to the value in P1, respectively, as shown by the fitting curves. In P3, $C_p$ drops to zero. In P4, the measured $C_p$ shows a cutback due to the remaining ice on the turbine. Note that the low inflow wind speeds in P4 amplify the variations in TSR induced by the change in $\omega$, resulting in a wide scatter of $C_p$s. Noteworthily, compared with the ideal $C_p$ curve, the measured $C_p$ not only drops down due to the ice-induced degradation in aerodynamic properties but also shifts to lower TSRs due to the variation in turbine rotor speed associated with icing. Such icing-induced turbine rotation has not been fully considered in most simulations of turbine icing, which may lead to an over or under-estimate of $C_p$ depending on the TSR range of simulated turbine.

Structural Degradation Characterization

Following the assessment of icing impact on power reduction, the influence of icing on the structural response of turbine blades is also investigated using blade strain measurements. The flapwise blade bending moment ($M_{Flap}$) and edgewise blade bending moment ($M_{Edge}$) are calculated based on the differences between the strain measurements at HP and LP, and LE and TE, respectively. Note that $M_{Flap}$ and $M_{Edge}$ are along with the directions perpendicular and parallel to the chord of the blade cross-section, respectively. The moments at different radial positions of three blades show similar trends, and thus only the results at the blade root of one blade are presented in the following work to represent the icing impact on blade structural response.

FIG. 14 shows the time series of $M_{Flap}$ and $M_{Edge}$ for different sample datasets. Specifically, FIGS. 14A-14E show time series of the normalized flapwise blade root bending moment ($M_{Flap}$/max($M_{Flap}$)) and edgewise blade root bending moment ($M_{Edge}$/max($M_{edge}$)) for the P1, P2-I, P2-T, P3, and P4 datasets, respectively. The inset figures show the normalized blade root bending moments over short periods as denoted with red dots to present more details.

Figure 14A:
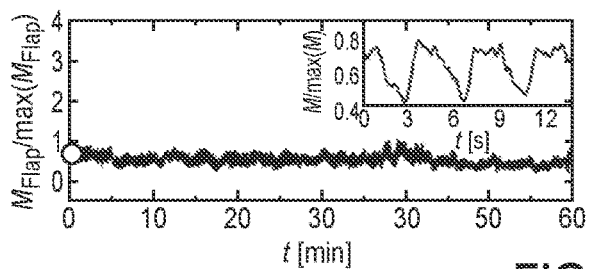
FIGS. 14A-14E show time series of the normalized flapwise blade root bending moment ($M_{Flap}$/max($M_{flap}$)) and edgewise blade root bending moment ($M_{Edge}$/max($M_{Edge}$)) for the P1, P2-I, P2-T, P3, and P4 datasets, respectively
Figure 14A:
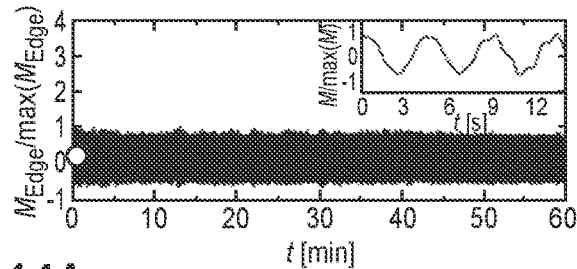
Figure 14B:
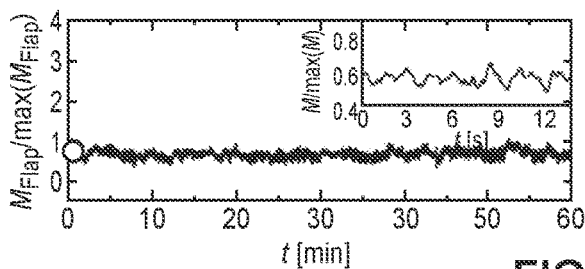
Figure 14B:
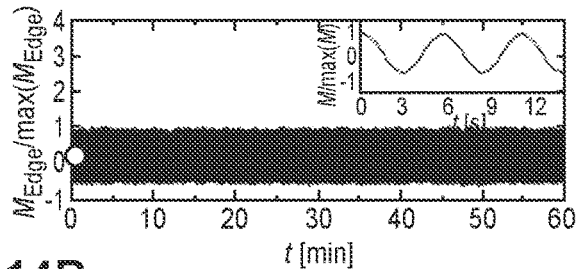
Figure 14C:
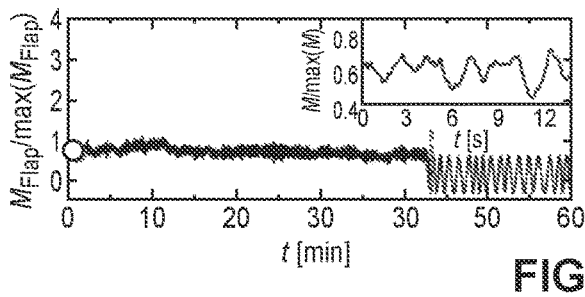
Figure 14C:
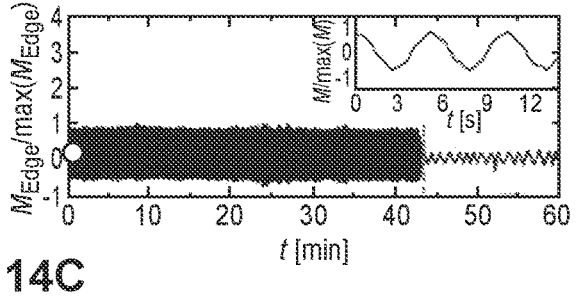

In P1 of the pre-icing phase, no appreciable icing effect on $M_{Flap}$ and $M_{Edge}$ is observed in comparison to the blade response results under no icing but similar inflow conditions (Gao, L., Yang, S., Abraham, A., Hong, J., 2020. Effects of Inflow Turbulence on Structural Deformation of Wind Turbine Blades. J. Wind Eng. Ind. Aerodyn. 199, 104137. https://doi.org/10.1016/j jweia.2020.104137). Specifically, the $M_{Flap}$ and $M_{Edge}$ exhibit clear periodical features corresponding to the rotor rotation frequency ($f_T$), and the $M_{Flap}$ shows a significantly higher amplitude and more jitters (comparing to $M_{Edge}$) due to its higher sensitivity to the change of turbine structural configuration (i.e., the change of blade positions with respect to the turbine tower). In P2-I of the operational-icing phase, the periodic feature in the $M_{Flap}$ signal diminishes as the aerodynamic characteristics of blade degrades upon the ice-induced changes in its cross-sectional shape (FIG. 14B). In contrast, the periodicity of $M_{Edge}$ signal retains, and its positive and negative values indicate the moments along and against the rotational direction of the blade, which is little affected by the ice accretion. However, we observe that the $M_{Flap}/M_{Edge}$ yields a 20% decrease on average in comparison to that of the no icing case. Such difference can be attributed to the combined effect of degraded lift and increased blade mass due to ice accretion.

Figure 14D:
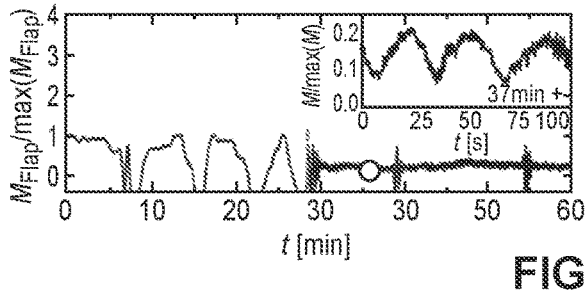
Figure 14D:
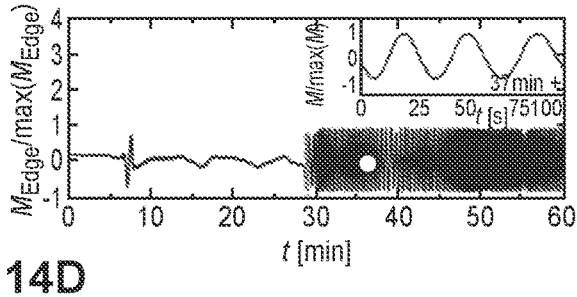
Figure 14E:
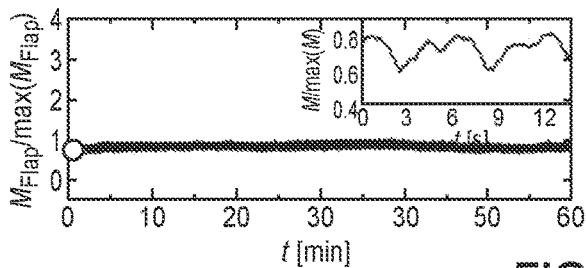
Figure 14E:
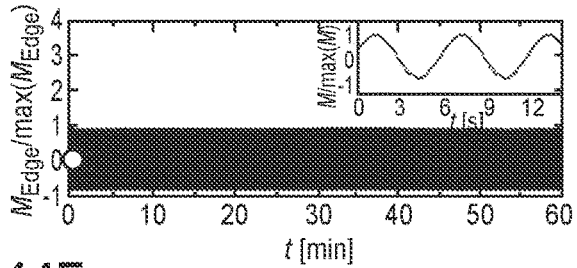

As the turbine transitions to the later stage of the operational-icing phase (P2-T, shown in FIG. 14C), the periodic feature in the $M_{Flap}$ signal also blurs due to the increasing ice accretion on turbine blades, while that in $M_{Edge}$ is less affected, similar to the observations in P2-I. As the blades feather to ~80° at ~42 min of P2-T, the $M_{Flap}$ starts to oscillate at a higher amplitude with increased periodicity while the $M_{Edge}$ shows a significantly reduced oscillation. With more ice accretion on blade surfaces (the beginning of P3 in the stopped-icing phase), the oscillations in the $M_{Flap}$ and $M_{Edge}$ signals become more irregular as the blade idles around its equilibrium position (FIG. 14D). The induced blade oscillation substantially increases the magnitude of $M_{Flap}$, which is highly detrimental for blades and can lead to potential structural damage. As the turbine pitch reduces (~28 min from the start of P3), the periodicity in $M_{Flap}$ and $M_{Edge}$ re-emerges with a much longer cycle due to the very small $\omega$ in this phase (no power generation). The $M_{Flap}$ signal contains appreciable jitters, potentially corresponding to the ice-accretion caused blade loading imbalance that enhances the vibration or natural resonance of the blade at high frequencies. Near the end of the post-icing phase (P4 shown in FIG. 14E), the $M_{Flap}$ and $M_{Edge}$ signals present similar features to those in P1 with no appreciable icing impact observed.

To have a better understanding of the blade structural responses in each icing phase, spectral analysis for the $M_{Flap}$ and $M_{Edge}$ signals are conducted, as shown in FIGS. 15A-15D. Specifically, FIGS. 15A-15D are charts showing power spectra of the flapwise blade root bending moment ($M_{Flap}$) and edgewise blade root bending moment ($M_{Edge}$) for (a) P1, (b) P2-I, (c) P2-T, (d) P3, and (e) P4 datasets, respectively. Demarcated by the rotor frequency ($f_D=U_{hub}/D$), two frequency ranges are referred to as the lower (i.e., $f<f_D$) and higher (i.e., $f>f_D$) ranges.

In P1 of the pre-icing phase, the spectra of the $M_{Flap}$ and $M_{Edge}$ signals show similar features to no icing case presented in the literature (Gao, L., Yang, S., Abraham, A., Hong, J 2020b. Effects of Inflow Turbulence on Structural Deformation of Wind Turbine Blades. J. Wind Eng. Ind. Aerodyn. 199, 104137. https://doi.org/10.1016/j.jweia.2020.104137). Specifically, the spectra of the $M_{Flap}$ nd $M_{Edge}$ signals exhibit dominant peaks corresponding to the rotational frequency (i.e., $f_T$=0.2 Hz) and its high-order harmonies. In comparison to the $M_{Edge}$ signals, the spectrum of the $M_{Flap}$ signal yields higher energies at $2f_T$ and $3f_T$ (i.e., the blade passing frequency $f_{BPF}$), which explains the high-frequency jitters in the periodic time series of $M_{Flap}$ data. Besides the prominent spectral peaks in the higher frequency range of $M_{Flap}$ (i.e., at 0.60 Hz and 1.9 Hz) and $M_{Edge}$ (i.e., at 1.0 Hz and 3.1 Hz) agree well with the 1$^{st}$ and 2$^{nd}$ modes of natural blade frequencies in flapwise and edgewise directions, respectively. Remarkably, compared with no icing case (inset in FIG. 15A), the spectral peaks at $f_T$ in the $M_{Flap}$ and $M_{Edge}$ signals are broadened, potentially due to the time-varying blade shapes with continuous ice accretion. This trend implies that the blade structural response is more sensitive to icing influence and can be potentially used as an effective marker for timely and accurate ice detection/identification.

Figure 15A:
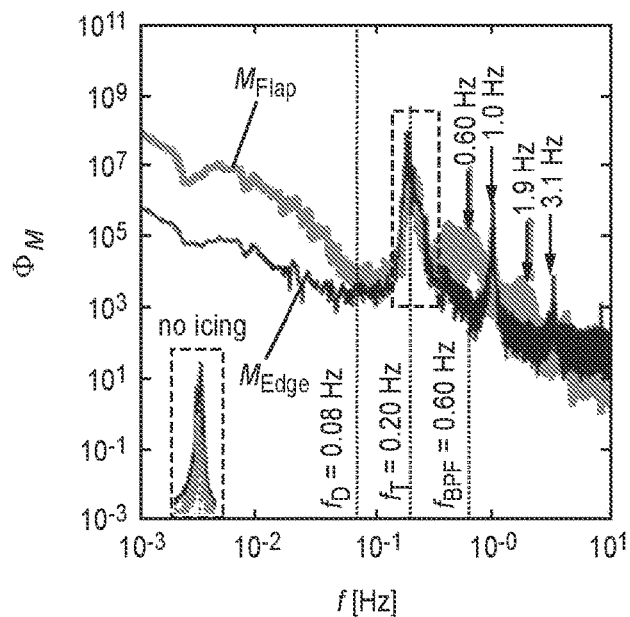
FIGS. 15A-15E are charts showing power spectra of the flapwise blade root bending moment ($M_{Flap}$) and edgewise blade root bending moment ($M_{Edge}$) for (a) P1, (b) P2-I, (c) P2-T, (d) P3, and (e) P4 datasets, respectively.
Figure 15B:
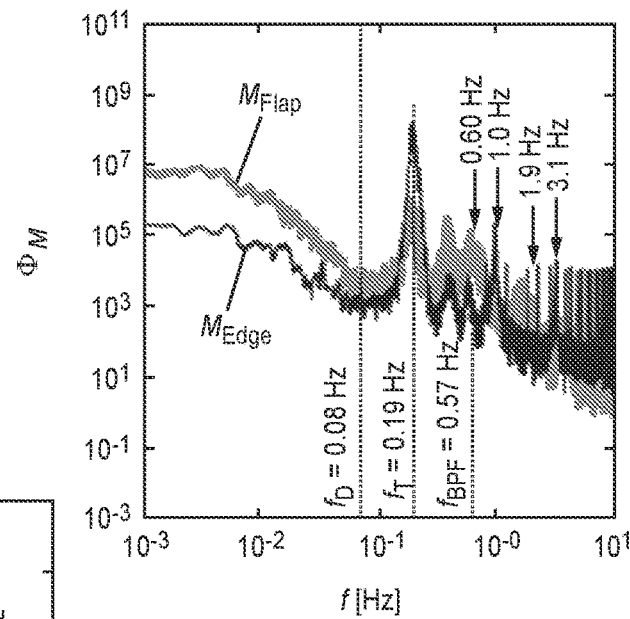

In P2-I of the operational-icing phase, as shown in FIG. 15B, the slight rotor speed reduction results in the spectral peaks in the $M_{Flap}$ and $M_{Edge}$ signals shifting from 0.22 Hz (no icing with same inflow conditions) to $f_T$=0.19 Hz. At $f_T$, the spectrum of the $M_{Flap}$ yields much lower energy than that of the $M_{Edge}$, different from the same magnitudes observed in P1, suggesting the enhanced ice-induced effect on lift degradation. In addition, like the observation in P1, the spectral peaks at $f_T$ are also broadened associated with the constantly evolving ice accretion. The natural blade frequencies remain the same values as those in P1, indicating that they are not affected by ice accretion or operation changes.

Figure 15C:
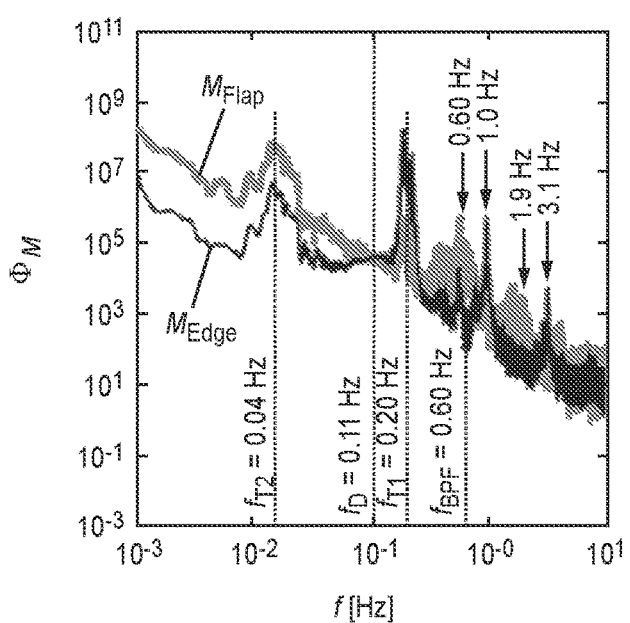

In the latter stage of the operational-icing phase, i.e., P2-T in FIG. 15C, the appreciable rotor speed reduction before the transition at ~42 min leads to the spectral peaks at $f_{T1}$=0.20 Hz (instead of 0.25 Hz for the no icing case under same inflow conditions) in the $M_{Flap}$ and $M_{Edge}$ signals. At $f_{T1}$, the spectrum of $M_{Flap}$ yields even lower energies than that of the $M_{Edge}$ due to the diminished lift, similar to the observation in P2-I. In addition, the substantial decrease after the transition contributes to the spectral peaks at $f_{T2}$=0.04. However, at $f_{T2}$, an opposite trend that the spectrum of the $M_{Flap}$ yields higher energies than that of the $M_{Edge}$ is observed. Such a trend is primarily associated with the enhanced periodicity in the $M_{Flap}$ signals caused by the increased contribution from gravity. The secondary reason is potentially related to the stronger correlation between the $M_{Flap}$ and the large-scale inflow structures in the lower frequency range (i.e., $f<f_D$) in comparison to the $M_{Edge}$. Besides, the natural blade frequencies in flapwise and edgewise directions yield no deficits in comparison to the no icing case, suggesting that identification of turbine icing with decreased natural frequency as reported in the lab-scale experimental work (Gantasala, S., Luneno, J. C., Aidanpää, J. O., 2018. Identification of ice mass accumulated on wind turbine blades using its natural frequencies. Wind Eng. 42, 66-84. https://doi.org/10.1177/0309524X17723207) is not applicable in this icing phase.

Figure 15D:
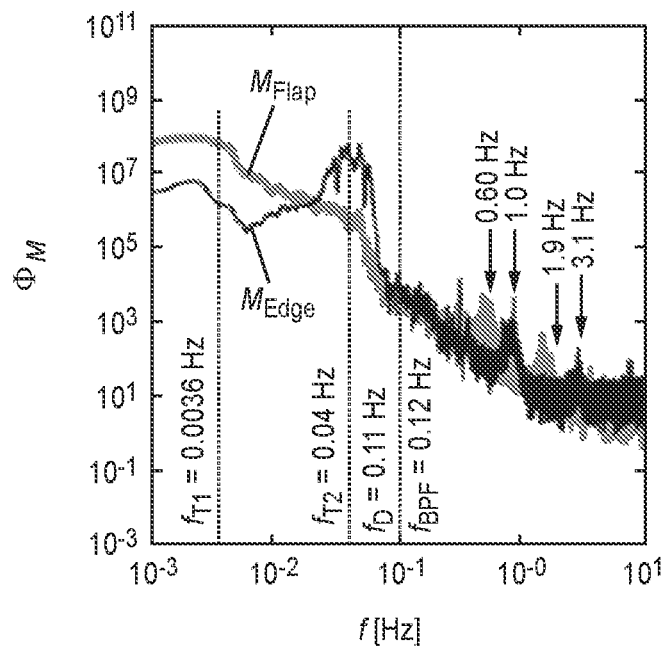

In P3 of the stopped-icing phase, the turbine stays idling around its equilibrium position before ~28 min and no clear spectral peaks corresponding to the rotational frequency at $f_{T1}$=0.0036 Hz, as shown in FIG. 15D. In the latter period (after ~28 min) with a reduction in pitch angle, the turbine starts slowly rotating with no power generation, contributing to the spectral peaks at $f_{T2}$=0.04 Hz in the $M_{Flap}$ and $M_{Edge}$ signals, significantly lower than 0.21 Hz in the no icing case where the turbine is producing power. At $f_{T2}$, the spectrum of $M_{Flap}$ yields much lower energies than that of the $M_{Edge}$, opposite to the observation in P2-T, mainly due to the reduced pitch angle and the substantial ice-induced lift degradation. Noticeably, the natural blade frequencies for the $M_{Flap}$ slightly decrease while those for $M_{Edge}$ almost stay the same as the no icing case, indicating the natural blade frequencies corresponding to the 1$^{st}$ and 2$^{nd}$ flapwise modes are more sensitive to icing effects.

Figure 15E:
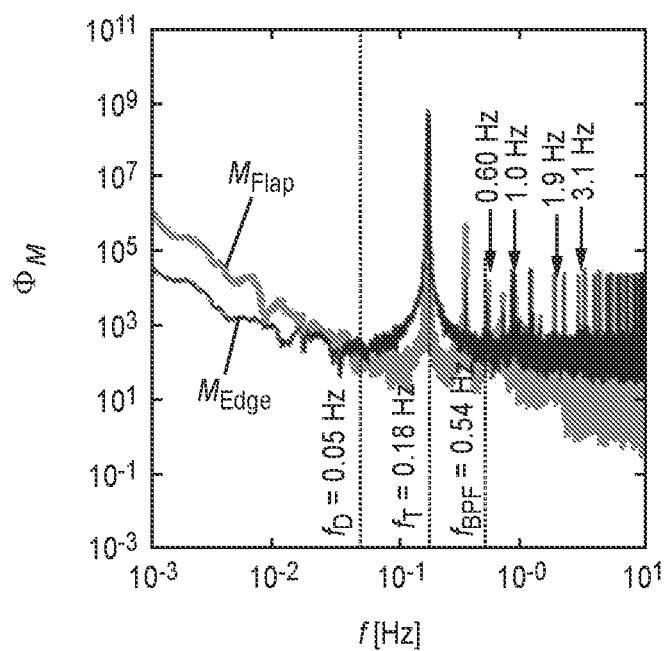

In P4, the spectra of the $M_{Flap}$ and $M_{Edge}$ signals exhibit sharp peaks at $f_T$=0.18 Hz as the no icing case because the turbine almost returns to its normal operation near the end of the post-icing phase, as shown in FIG. 15E. However, the remaining ice structures lead to an appreciable reduction in the natural blade frequencies in both flapwise and edgewise directions in comparison to the no icing case. Noteworthily, ice-induced natural frequency deficits can be used for ice detection based on their well-controlled lab-scale experiments. However, considering the natural frequency variations in all icing phases observed in our experiments, we conclude that such natural frequency deficits are likely to be phase/flow-dependent and therefore are an effective parameter for ice detection in the field.

In addition to the blade response, the tower structural responses in terms of the fore/aft moment ($M_{FA}$) and the side-to-side moment ($M_{SS}$) are also investigated for each icing phase. The pairs of the strain measurements along and perpendicular to the inflow wind direction are used to estimate the $M_{FA}$ and $M_{SS}$, respectively. Note that the time sequences of the $M_{FA}$ and $M_{SS}$ are not presented in the current study since their signals are strongly correlated with inflow speed and exhibit no appreciable signatures related to icing.

Figure 16A:
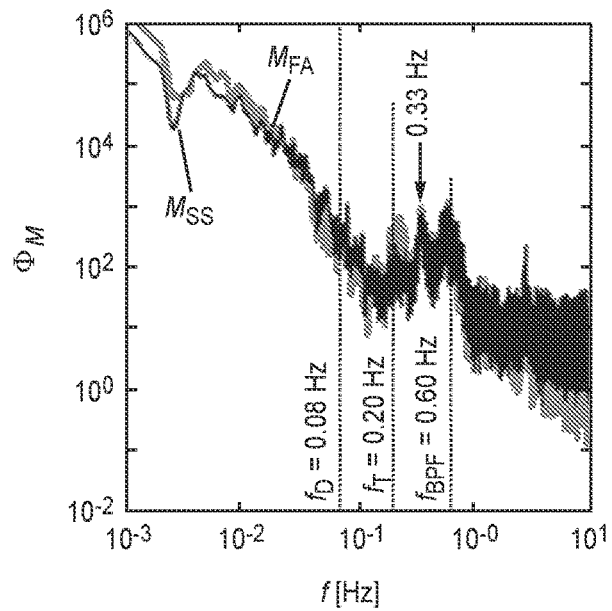
FIGS. 16A-16E are charts showing power spectra of the tower fore/aft moment ($M_{FA}$) and side-to-side moment ($M_{SS}$) for (a) P1, (b) P2-I, (c) P2-T, (d) P3 and (e) P4 datasets, respectively.

FIGS. 16A-16E presents the power spectra of the $M_{FA}$ and $M_{SS}$ signals for different icing phases. Specifically, FIGS. 16A-16E are charts showing power spectra of the tower fore/aft moment ($M_{FA}$) and side-to-side moment ($M_{SS}$) for (a) P1, (b) P2-I, (c) P2-T, (d) P3, and (e) P4 datasets. In P1 of the pre-icing phase, as shown in FIG. 16A, the spectra of the $M_{FA}$ and $M_{SS}$ signals present similar signatures to the no icing case reported in the literature (Gao et al., 2020b). Specifically, the spectra of the $M_{FA}$ and $M_{SS}$ show dominant peaks at 3$f_T$ (i.e., the blade passing frequency $f_{BPF}$) rather than $f_T$ in blade response spectra. In comparison to the $M_{SS}$, the spectrum of the $M_{FA}$ signals yields higher energies at $f_T$ since it is more sensitive to the rotation imbalance induced by the wind shear effect within a rotational cycle. The spectral peaks observed at 0.33 Hz match well with the natural frequency of the 1$^{st}$ tower mode for the no icing turbine.

Figure 16B:
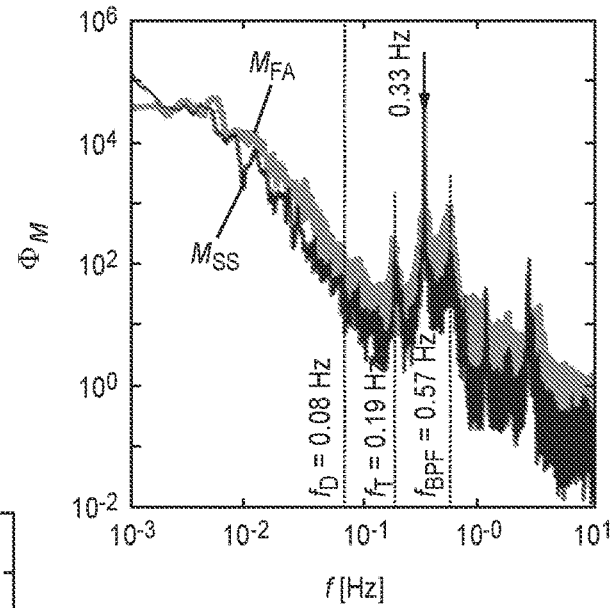

In P2-I of the operational-icing phase, as shown in FIG. 16B, the reduction in rotor speed leads to the spectral peaks of the $M_{FA}$ and $M_{SS}$ signals shifting to slightly lower frequencies (i.e., at $f_T$=0.19 Hz and $f_{BPF}$=0.57 Hz vs. 0.22 Hz and 0.66 Hz for no icing case under the same inflow conditions). The rotor speed reduction also results in the overall lower energies observed in the spectrum of the $M_{SS}$ signals than that of the $M_{FA}$, since the $M_{FA}$ signals are less sensitive to the rotor speed reduction. Besides, different from the observations in P1, the energy levels of the spectral peaks at $f_T$ in the $M_{FA}$ and $M_{SS}$ signals increase to the comparable levels to the peaks at $f_{BPF}$, suggesting the increasing rotation imbalance due to ice accretion. Furthermore, the spectra of $M_{FA}$ and $M_{SS}$ signals exhibit much higher energies at the natural frequency of 0.33 Hz associated with its enhanced sensitivity to the wind shear with ice accretion.

Figure 16C:
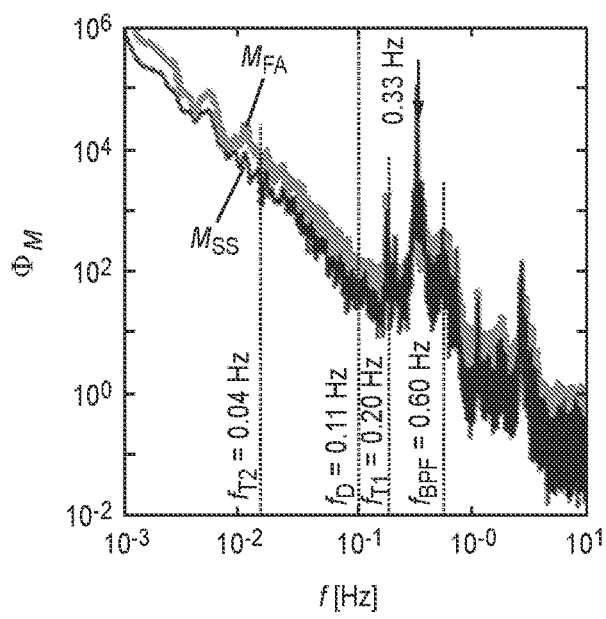
Figure 16D:
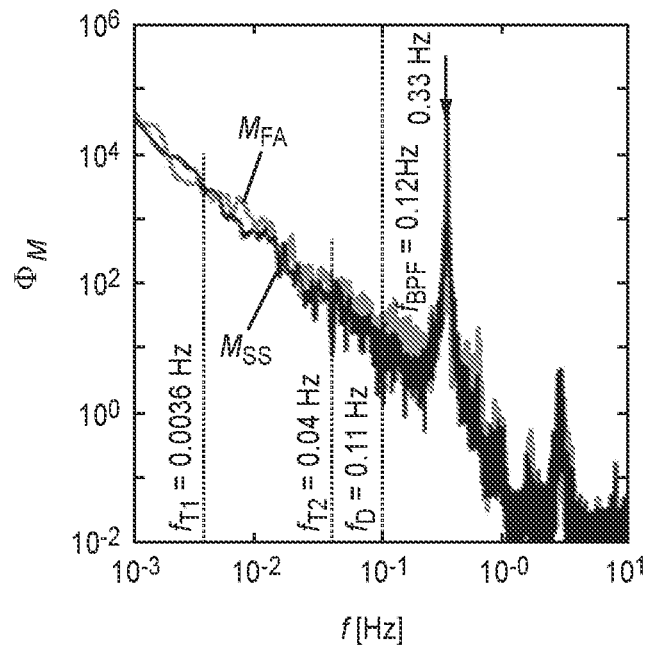

The P2-T of the latter stage of the operational-icing phase exhibit generally similar trends to those in P2-I, as shown in FIG. 16C. Specifically, the spectral peaks of the $M_{FA}$ and $M_{SS}$ signals at $f_T$ and $f_{BPF}$ shift from 0.25 Hz and 0.75 Hz (no-icing case) to the lower frequencies of 0.20 Hz and 0.60 Hz associated with the rotor speed reduction before the transition at ~42 min. The spectral peaks corresponding to the natural frequency of the $1^{st}$ tower mode remain at 0.33 Hz with high energy levels. The spectrum of the $M_{SS}$ signals yields overall lower energies than that of the $M_{FA}$ signals. However, in contrast to the observations in P1 and P2-I, the spectral peaks at $f_T$ exhibit higher energies in comparison to the peaks at $f_{BPF}$ associated with the enhanced rotation imbalance. In addition, unlike the blade response, no clear peaks in the spectra of the $M_{FA}$ and $M_{SS}$ signals correspond to the blade rotation after the transition, suggesting that the slow rotation has a limited effect on the turbine-scale structural behaviors.

In P3, the turbine comes into the stopped-icing phase with no power generation and substantial rotor speed reduction. In comparison to the blade spectra, the spectra of $M_{FA}$ and $M_{SS}$ signals present no clear peaks at $f_T$ and $f_{BPF}$ in spite of the significant change of blade pitch (i.e., blade pitches to small magnitude from its featuring of ~80 after ~28 min), indicating these signals are insensitive to the blade operation during this phase. In comparison to P2-T (the similar inflow conditions, i.e., Region 2.5), the spectra of the $M_{FA}$ and $M_{SS}$ signals show much lower energies due to the substantially reduced rotor speed. In addition, the natural frequency of $1^{st}$ tower mode remains at 0.33 Hz, which is not affected by ice accretion or turbine operation.

Figure 16E:
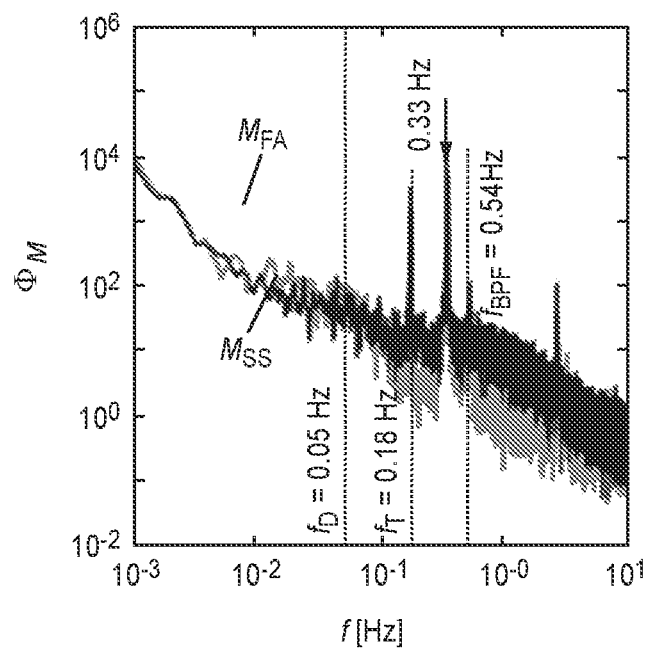

As the turbine almost returns to its normal operation in P4 near the end of the post-icing phase, as shown in FIG. 16E, the spectral peaks re-emerge at $f_T$ and $f_{BPF}$ in the $M_{FA}$ and $M_{SS}$ signals. The spectra of $M_{FA}$ and $M_{SS}$ signals exhibit higher energy levels at $f_T$ than those at $f_{BPF}$ associated with the strong effect of the rotational imbalance, potentially due to the remaining ice and occasional ice shedding. It should be noted that the overall lower energies observed in the spectra of the $M_{FA}$ and $M_{SS}$ signals are mainly related to the small inflow wind speeds (Region 1.5). The natural frequency of the $1^{st}$ tower mode retains the same as its original value for no icing turbine. In summary, the icing event has a negligible effect on natural tower frequency.

Figure 17A:
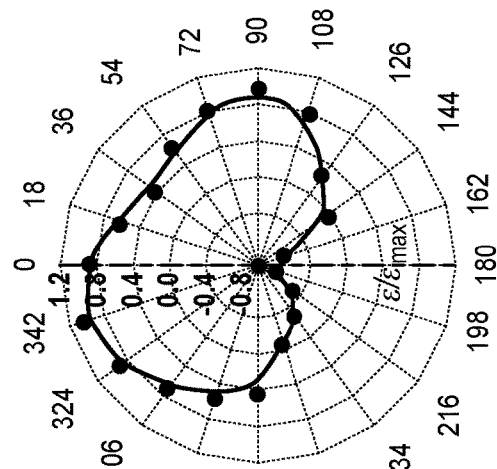
FIG. 17A illustrates tower strain distribution at tower base for the P1 dataset.
Figure 17B:
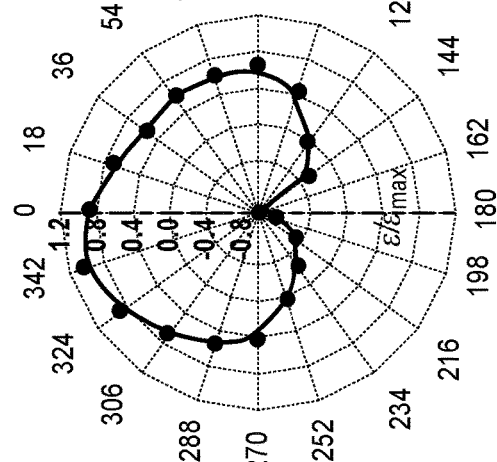
FIG. 17B illustrates tower strain distribution at tower base for the P2-I dataset.
Figure 17C:
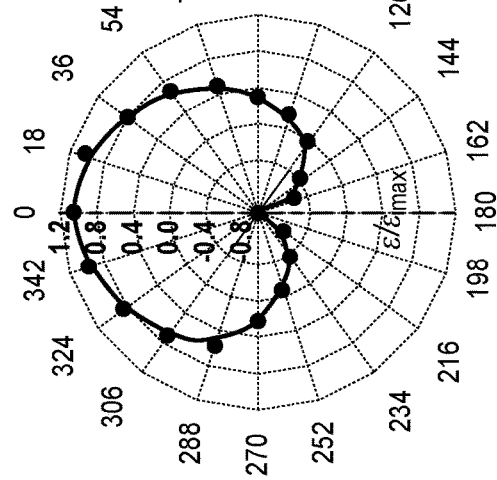
FIG. 17C illustrates tower strain distribution at tower base for the P2-T dataset.
Figure 17D:
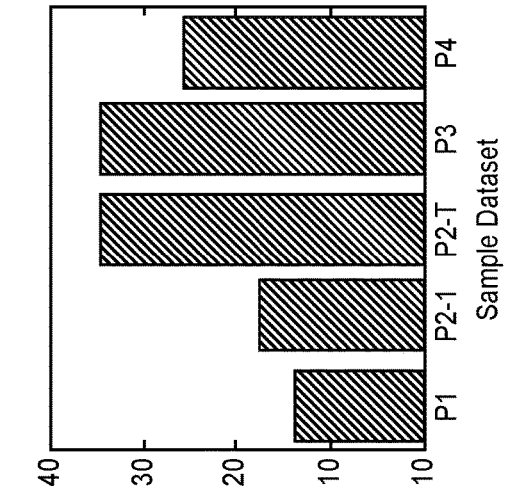
FIG. 17D illustrates tower strain distribution at tower base for the P3 dataset.
Figure 17E:
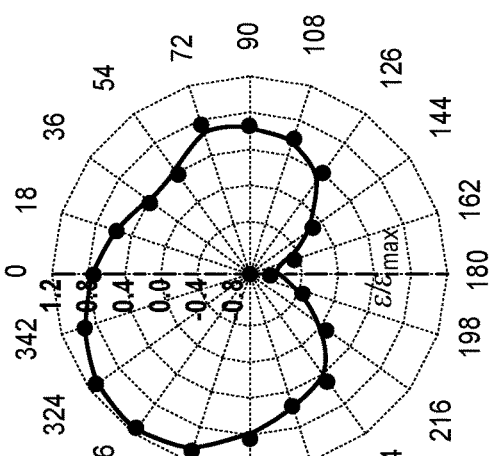
FIG. 17E illustrates tower strain distribution at tower base for the P4 dataset.
Figure 17F:
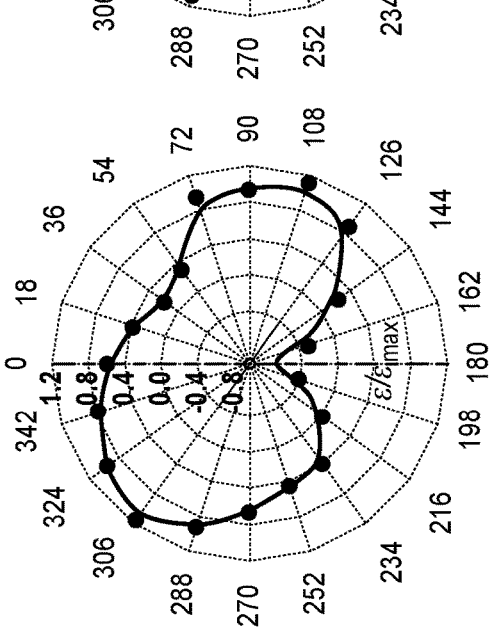
FIG. 17F illustrates a symmetry index to characterize the distribution asymmetry.

FIGS. 17A-17F illustrates tower strain distribution ($\varepsilon/\varepsilon_{max}$) at tower base for (a) P1, (b) P2-I, (c) P2-T, (d) P3, (e) P4 datasets, and (f) the symmetry index (SI) to characterize the distribution asymmetry. In other words, FIG. 17A illustrates tower strain distribution at tower base for the P1 dataset, FIG. 17B illustrates tower strain distribution at tower base for the P2-I dataset, FIG. 17C illustrates tower strain distribution at tower base for the P2-T dataset, FIG. 17D illustrates tower strain distribution at tower base for the P3 dataset, FIG. 17E illustrates tower strain distribution at tower base for the P4 dataset, and FIG. 17F illustrates a symmetry index to characterize the distribution asymmetry.

The maximum strain magnitude normalizes the tower strain measurements, $\varepsilon_{max}=(\max(\varepsilon)+|\min(\varepsilon)|)/2$, where $\varepsilon$ is the set of strain readings from all 20 strain gauges at a single timestamp. The dashed lines in (a-e) correspond to the axis of symmetry.

To have a better understanding of the ice-induced loading imbalance, the strain distribution at the tower base is analyzed for each icing phase using the normalized strain measurements ($\varepsilon/\varepsilon_{max}$, where $\varepsilon_{max}=(\max(\varepsilon)+|\min(\varepsilon)|)/2$), as shown in FIGS. 17A-17F. The 0-axis for each of FIGS. 17A-17E is set to be along with the inflow direction. In addition, the symmetry index (defined as $SI=\Sigma|\varepsilon_{side1}-\varepsilon_{side2}|/(n\varepsilon_{max})\times 100\%$, where $\varepsilon_{side1}$ and $\varepsilon_{side2}$ are the strain measurements on two sides of the axis of symmetry (i.e., 0-180 axis highlighted with dashed lines in FIGS. 17A-17E); n is the number of pairs of strain measurements, n=10 in the present study) is used to quantify of the asymmetry of the strain distribution and thereby reflect the potential loading imbalance.

In P1 of the pre-icing phase, as shown in FIG. 17A, the strain distribution shows similar symmetric signatures to the no icing case presented in the literature (L. Chamorro et al., 2015). Specifically, the positive and negative values refer to tension and compression, respectively. The absolute magnitude of strain reaches the maximum along with the inflow wind direction corresponding to the prevailing wind-driven $M_{FA}$. The rotor rotation leads to a slight asymmetry of SI=13% related to the $M_{SS}$. As the turbine moves from P2-I (FIG. 17B) to P2-T (FIG. 17C) of the operational-icing phase, the SI exhibits a significant increase of asymmetry from 17% to 34% (FIG. 17F), potentially due to the increasing ice accretion and caused loading imbalance of the turbine structure. As the turbine enters the standstill/idling status in P3 (FIG. 17D), the asymmetry of the loading shows little change (i.e., stays around SI of 34%). In P4 near the end of the post-icing phase, the remaining ice on the turbine generates no power deficits, but it has a significant impact on the loading imbalance reflected by the SI=26%. This observation also resonates with the higher energy levels of the spectral peaks at $f_T$ than those at $f_{BPF}$ of the $M_{FA}$ and $M_{SS}$ signals shown in FIG. 16E.

Conclusions and Discussions

The current study presents a systematic characterization of the performance degradation of a utility-scale wind turbine under natural icing environments using the field database from the Eolos Wind Energy Research Station (belongs to the IEA Ice Class 2 area). The database contains the meteorological icing (temperature and relative humidity) and flow conditions, wind turbine operation conditions, blade and tower strain measurements, and the supporting photos of ice-accreted turbine blades. A representative icing event that lasts 51 hours is selected and divided into the pre-icing, operational-icing, stopped-icing, and post-icing phases, mainly based on the variations of turbine operational conditions in terms of power output, rotor speed, and pitch angle. For each icing phase, one-hour sample datasets are selected to provide a detailed evaluation of the ice-induced effect on turbine operation, power production, and structural response. The main findings are summarized as follows.

There is no detectable icing impact on turbine operation in the pre-icing phase, even if the meteorological conditions are satisfied. The appreciable reductions in the rotor speed and pitch angle (i.e., the differences between the measured values under icing conditions and modeled values under no icing conditions with same inflow speeds) declare the onset of the operational icing phase. Such reductions are found to enlarge as the inflow wind speed increases, which may accelerate the blade/airfoil stall process and contribute to more severe power deficits. With the increasing ice accretion, the turbine reaches its operational limit and enters the stopped-icing phase, where the pitch angle dramatically increases to its feathering value (may not exactly 90° in the field), and the rotor speed drops to almost zero. In this period, the turbine produces no power even if the pitch angle may reduce with a slight increase of the rotor speed due to the occasional ice shedding from the turbine blades. As the turbine restarts to generate power, the post-icing phase begins. The power deficit gradually diminishes as the ice melts and becomes negligible near the end of this phase, during which the deficit in the rotor speed remains appreciable, potentially due to the small amount of residual ice on the turbine structures.

During the 51-hour icing event, the turbine has a total energy loss of approximately 25 MWh, i.e., 63% of the amount of energy to be generated (~40 MWh). For a 0.10 $/kWh contract, this energy loss is equivalent to a $2511 financial deficit for this event. Following the stopped-icing phase (71%), the post-icing phase yields the second-largest share of the energy loss (17%) due to its long duration associated with slow natural ice melting while the operational-icing phase contributes to a share of 12%. It should be noted that at the end of the operational-icing phase, the turbine power exhibits a sudden drop from ~400 kW to zero rather than a smooth transition when the turbine reaches its operational limit based on the conventional control strategy. In addition, the power deficit shows a strong correlation with the inflow speed associated with the aforementioned more substantial decreases of rotor speed and pitch angle at higher wind speeds. The non-dimensional power coefficient ($C_p$) vs. tip speed ratio (TSR) curve shows a strong dependence of the $C_p$ deficits with respect to the changes in TSR during the turbine operating in icing environments, which has not been considered in most of the blade icing simulations nowadays. The result shows the $C_p$ reaches its maximum degradation around the optimal TSR ($TSR_{opt}$=8.3) of the turbine.

The blade structural response is found to be highly sensitive to the icing effect. The potential ice accretion in the pre-icing phase causes the broadening of the spectral peaks of the blade signals due to their fast reactions to the lift penalties associated with the blade leading-edge ice accretion. In the operational-icing phase, the periodicity in the flapwise blade root bending moment ($M_{Flap}$) substantially blurs as the aerodynamic characteristics of blades degrade further upon the ice-induced changes in its cross-sectional shape. In contrast, the periodicity of edgewise moment ($M_{Edge}$) retains because it is dominated by the gravitational force of the turbine blade, which is not significantly affected by the ice accretion (Gao et al., 2020b). As the turbine blade feather during the transition to the subsequent stopped-icing phase, the ice-induced blade oscillation substantially increases the magnitude of $M_{Flap}$, which is highly detrimental for blades and can lead to potential structural damage. The natural frequencies corresponding to the $1^{st}$ and $2^{nd}$ blade flapwise modes slightly decrease in this period while those for edgewise modes remain the same as the no icing case. In the post-icing phase, the natural frequencies in both flapwise and edgewise directions present an appreciable reduction.

In comparison to the blade structural response, the tower structural response is less influenced by the ice-induced rotor speed variation. If the rotor speed drops below the rotor frequency (i.e., $f_D=U_{hub}/D$, where $U_{hub}$ and D refer to the hub-height wind speed and the rotor diameter), the tower structural signals yield no spectral peaks corresponding to the rotor rotation. The natural frequency corresponding to the $1^{st}$ tower mode remains the same as the no icing case across all icing phases. However, the dominant spectral peaks observed in the tower fore/aft and side-to-side moments ($M_{FA}$ and $M_{SS}$) at the blade passing frequency ($f_{BPF}=3f_T$) for the no icing case are overshadowed by the spectral peaks corresponding to the rotational frequency ($f_T$) due to the ice-induced loading imbalance. With the strain distribution at the tower base, a significant increase in asymmetry from 13% (pre-icing phase) to 34% (stopped-icing phase) presents the enhanced loading imbalance in the course of the icing event. Even with a small amount of remaining ice near the end of the post-icing phase, the strain distribution also yields an asymmetry of 26%, indicating that the ice-induced loading imbalance is substantial for the turbine operating in the field.

Our findings not only bring insights into the improvements for the conventional ice detection techniques but also inspire the development of novel ice detection approaches, particularly for the indirect methods based on the good understandings of how the turbine behaves during an icing event. The indirect methods, unlike the direct methods, require no installation of ice sensors or onboard cameras and thus are highly flexible, cost-competitive, and demanded in the market. Based on our findings, the blade structural response (the broadening of the spectral peaks of the blade signals) is the most sensitive indicator for the icing effect due to its fast reaction to the ice-induced lift penalties at the early stages of an icing event, i.e., pre-icing and operational-icing phases. If the conditions permit, blade strain measurement is highly recommended for the turbines in cold climate regions. The strain response performs in a similar function as the ice detection sensors based on different types of accelerometers, such as BLADEcontrol (Bosch Rexroth), Fos4X, and Wölfel IDD.Blade (Weather Forecasts Renewable Energies Air and Climate Environmental IT, Cattin, R., Heikkila, U., Bourgeois, S., Raupach, O., Storck, F., 2016. Evaluation of ice detection systems for wind turbines, VGB Research Project No. 392), and it might be more susceptible to the influence of noises. Interestingly, our finding that the changes of the blade natural frequencies are not detectable in the early stages of an icing event, i.e., pre-icing and operational-icing phases. Such information implies that the methods based on the variations in the natural blade frequencies used in Fos4X and BLADEcontrol (Bosch Rexroth) may not be that sensitive for ice detection at early stages. For the majority of turbines not equipped with blade strain gauges, the reductions in the rotor speed and pitch angle are also more effective indicators for icing event detection than the commonly used power deficit. Furthermore, nowadays, many turbines manufacturers (e.g., GE Energy, Vestas, Enercon) offer ice protection systems (IPS) that tend to mitigate the impact of ice on the turbine behavior. The best operational strategy for IPS is still an open-ended question in the community as it depends on a lot of meteorological (temperature, wind speed, LWC) and technological (the type of system, the power consumed, . . . ) factors. The first-hand information of the turbine behaviors in different icing phases provides inspirations for perpetuating efficient use of the current thermal-based IPSs. For example, the onset of the post-icing phase might be a good turn-on time of the conventional thermal systems (e.g., hot air projection or resistive heating) to remove the ice structures accreted on turbine blades. Their functions are to significantly shorten the slow natural melting process and thus reduce power loss. More importantly, our findings provide a basis for the advanced control frameworks based on the different operations in various phases to compensate for the aerodynamic penalties and structural imbalance. The active pitch control and the operational stop (or active rotor speed reduction) approaches are suggested to be implemented in the pre-icing and operational-icing phases to reduce the amount of ice accreted on the turbine blades, especially over the suction-side surfaces. A lower feathering angle of the blade can trigger a positive influence on the load mitigation in the stopped-icing phase.

It should be noted that the derived findings (qualitative trends) of the present study can be generalized for variable-speed variable-pitch (VSVP) turbines operating in Regions 1.5-2.5. The different characteristics in Region 3 may influence our findings in their implementations to some extent. It also should be cautioned that more analysis of the turbine behaviors under different icing conditions (e.g., in-cloud, precipitation-icing, frost, etc.) are needed before further generalization. Future work will focus on seeking the quantitative linkage between the variations in wind turbine quantities and the amount of ice accretion for refining the advanced control frameworks mentioned above.

In one or more examples, the algorithms, operations and functions described may be implemented in hardware, software, firmware, or any combination thereof If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

The invention claimed is:

1. A method for controlling a wind turbine, the method comprising:
    determining, with a control system, that an icing event has begun to affect the wind turbine;
    based on a determination that the icing event has begun to affect the wind turbine, changing a phase of the wind turbine with the control system to an operational-icing phase, wherein changing the phase of the wind turbine to the operational-icing phase comprises:
        determining a modified angle of attack of blades of the wind turbine based on a current wind speed, current power production of the wind turbine, and baseline power production data; and
        modifying an angle of attack of the blades of the wind turbine to the modified angle of attack via changing a blade pitch angle, wherein the wind turbine continues to generate electrical power when the wind turbine is in the operational-icing phase; and
    based on a determination that electrical power generation of the wind turbine is below a threshold, changing the phase of the wind turbine with the control system to a stopped-icing phase, wherein rotation of the blades of the wind turbine is halted when the wind turbine is in the stopped- icing phase.

2. The method of claim 1, further comprising:
    prior to changing the phase of the wind turbine to the operational-icing phase and based on a determination that the icing event is likely to affect the wind turbine within an upcoming time period, changing the phase of the wind turbine to a pre-icing phase with the control system; and
    while the wind turbine is in the pre-icing phase, generating the baseline power production data that associates electrical power production of the wind turbine with wind speed.

3. The method of claim 1, wherein the rotation of the blades of the wind turbine is halted when the angle of attack of the blades of the wind turbine reaches a stall angle.

4. The method of claim 1, further comprising based on the wind turbine entering the stopped-icing phase, turning trailing edges of the blades of the wind turbine toward a windward direction.

5. The method of claim 1, further comprising:
    determining that the icing event has ended; and
    based on a determination that the icing event has ended, changing the phase of the wind turbine to a post-icing phase, wherein changing the phase of the wind turbine to the post-icing phase comprises changing performing actions to reduce an amount of ice that has accumulated on the blades of the wind turbine.

6. The method of claim 5, wherein determining that the icing event has ended comprises determining that the icing event has ended based on loading information regarding the blades or tower of the wind turbine.

7. The method of claim 1, wherein determining that the icing event has begun comprises determining that the icing event has begun based on loading information regarding the blades or tower of the wind turbine.

8. The method of claim 7, further comprising obtaining the loading information from at least one of:
    a torque sensor configured to detect torque produced by the blades of the wind turbine, or
    one or more thrust sensors configured to detect forces acting on the blades of the wind turbine, or
    one or more blade strain gauges or accelerometers to detect variations in deflection of the blades of the wind turbine, or
    one or more tower strain gauges or accelerometers to detect increased imbalance of the wind turbine due to ice accretion.

9. The method of claim 1, wherein determining that the icing event has begun comprises determining that the icing event has begun based on a weather forecast of temperature, relative humidity, and detection of precipitation.

10. A wind turbine control system comprising:
a communication unit configured to communicate with one or more controllers of a wind turbine; and
one or more processors configured to:
determine that an icing event has begun to affect the wind turbine;
based on a determination that the icing event has begun to affect the wind turbine, change a phase of the wind turbine with the control system to an operational-icing phase, wherein changing the phase of the wind turbine to the operational icing phase comprises:
determining a modified angle of attack of blades of the wind turbine based on a current wind speed, current power production of the wind turbine, and baseline power production data; and
modifying an angle of attack of the blades of the wind turbine to the modified angle of attack via changing blade pitch angles, wherein the wind turbine continues to generate electrical power when the wind turbine is in the operational-icing phase; and
based on a determination that electrical power generation of the wind turbine is below a threshold, change the phase of the wind turbine with the control system to a stopped-icing phase, wherein rotation of the blades of the wind turbine is halted when the wind turbine is in the stopped-icing phase.

11. The wind turbine control system of claim 10, wherein the one or more processors are further configured to:
prior to changing the phase of the wind turbine to the operational-icing phase and based on a determination that the icing event is likely to affect the wind turbine within an upcoming time period, change the phase of the wind turbine to a pre-icing phase with the control system; and
while the wind turbine is in the pre-icing phase, generate the baseline power production data that associates electrical power production of the wind turbine with wind speed, while the.

12. The wind turbine control system of claim 10, wherein the rotation of the blades of the wind turbine is halted when the angle of attack of the blades of the wind turbine reaches a stall angle.

13. The wind turbine control system of claim 10, wherein the one or more processors are configured to, based on the wind turbine entering the stopped-icing phase, cause the wind turbine to turn trailing edges of the blades of the wind turbine toward a windward direction.

14. The wind turbine control system of claim 10, wherein the one or more processors are configured to:
determine that the icing event has ended; and
based on a determination that the icing event has ended, change the phase of the wind turbine to a post-icing phase, wherein the one or more processors are configured to, as part of changing the phase of the wind turbine to the post-icing phase, cause the wind turbine to perform actions to reduce an amount of ice that has accumulated on the blades of the wind turbine.

15. The wind turbine control system of claim 14, wherein the one or more processors are configured to, as part of determining that the icing event has ended, determine that the icing event has ended based on loading information regarding the blades or tower of the wind turbine.

16. The wind turbine control system of claim 10, wherein the one or more processors are configured to, as part of determining that the icing event has begun, determine that the icing event has begun based on loading information regarding the blades or tower of the wind turbine.

17. The wind turbine control system of claim 16, wherein the one or more processors are further configured to obtain the loading information from at least one of:
a torque sensor configured to detect torque produced by the blades of the wind turbine, or
one or more thrust sensors configured to detect forces acting on a rotor of the wind turbine, or
one or more blade strain gauges or accelerometers to detect variations in deflection of the blades of the wind turbine, or
one or more tower strain gauges or accelerometers to detect increased imbalance of the wind turbine due to ice accretion.

18. The wind turbine control system of claim 10, wherein the one or more processors are configured to determine that the icing event has begun based on a weather forecast of temperature, relative humidity, and detection of precipitation.

19. A non-transitory computer-readable data storage medium having instructions stored thereon that, when executed, cause one or more processors to:
determine that an icing event has begun to affect a wind turbine;
based on a determination that the icing event has begun to affect the wind turbine, change a phase of the wind turbine with a control system of the wind turbine to an operational-icing phase, wherein changing the phase of the wind turbine to the operational-icing phase comprises:
determining a modified angle of attack of blades of the wind turbine based on a current wind speed, current power production of the wind turbine, and baseline power production data; and
modifying an angle of attack of the blades of the wind turbine to the modified angle of attack via changing a blade pitch angle, wherein the wind turbine continues to generate electrical power when the wind turbine is in the operational-icing phase; and
based on a determination that electrical power generation of the wind turbine is below a threshold, change the phase of the wind turbine with the control system to a stopped-icing phase, wherein rotation of the blades of the wind turbine is halted when the wind turbine is in the stopped- icing phase.

20. The non-transitory computer-readable data storage medium of claim 19, wherein the instructions, when executed, further cause the one or more processors to:
prior to changing the phase of the wind turbine to the operational-icing phase and based on a determination that the icing event is likely to affect the wind turbine within an upcoming time period, change the phase of the wind turbine to a pre-icing phase with the control system; and
while the wind turbine is in the pre-icing phase, generate the baseline power production data that associates electrical power production of the wind turbine with wind speed.

* * * * *

UNITED STATES PATENT AND TRADEMARK OFFICE
CERTIFICATE OF CORRECTION

PATENT NO. : 11,946,452 B2  
APPLICATION NO. : 18/005549  
DATED : April 2, 2024  
INVENTOR(S) : Jiarong Hong and Linyue Gao Page 1 of 1

It is certified that error appears in the above-identified patent and that said Letters Patent is hereby corrected as shown below:

In the Claims

Column 32, Lines 16 (Claim 1): Replace "stopped- icing phase" with -- stopped-icing phase --.

Column 33, Line 11 (Claim 10): Replace "operational icing" with -- operational-icing --.

Column 33, Line 39 (Claim 11): Replace "the wind turbine with wind speed, while the." with -- the wind turbine with wind speed. --.

Column 34, Lines 48 (Claim 19): Replace "stopped- icing phase" with -- stopped-icing phase --.

Signed and Sealed this  
Twenty-eighth Day of October, 2025

John A. Squires  
*Director of the United States Patent and Trademark Office*